US012631765B1

(12) United States Patent
Dimoff

(10) Patent No.: US 12,631,765 B1
(45) Date of Patent: May 19, 2026

(54) METHOD AND SYSTEM FOR ENABLING LOCATION FINDING AND MESSAGE COMMUNICATION BETWEEN A PLURALITY OF DIGITAL COMPASS DEVICES

(71) Applicant: Crowd Compass Inc., Spokane, WA (US)

(72) Inventor: Christopher James Stanley Dimoff, Ridgefield, WA (US)

(73) Assignee: Crowd Compass Inc., Spokane, WA (US)

( * ) Notice: Subject to any disclaimer, the term of this patent is extended or adjusted under 35 U.S.C. 154(b) by 0 days.

(21) Appl. No.: 18/756,157

(22) Filed: Jun. 27, 2024

Related U.S. Application Data

(60) Provisional application No. 63/575,456, filed on Apr. 5, 2024.

(51) Int. Cl.
*G01S 19/36* (2010.01)
*G01S 19/37* (2010.01)
(52) U.S. Cl.
CPC .............. *G01S 19/36* (2013.01); *G01S 19/37* (2013.01)
(58) Field of Classification Search
CPC .......... G01S 19/19; G01S 19/36; G01S 19/37; G01S 19/45; G01S 19/235
See application file for complete search history.

(56) References Cited

U.S. PATENT DOCUMENTS

| | | | | |
|---|---|---|---|---|
| 11,923,917 | B2 * | 3/2024 | Venkatraman | .......... G01S 19/01 |
| 12,169,245 | B2 * | 12/2024 | Nyhart | .................... G01S 19/45 |
| 12,298,388 | B2 * | 5/2025 | Asada | ...................... G01S 13/04 |
| 2018/0043210 | A1 * | 2/2018 | Niehaus | .................. A61B 5/11 |
| 2019/0094343 | A1 * | 3/2019 | Nyhart | ................. G01S 7/4808 |
| 2023/0305163 | A1 * | 9/2023 | Lauture | .................. G01S 19/48 |
| 2024/0310470 | A1 * | 9/2024 | Schweizer | ........... G01S 5/0273 |
| 2024/0337757 | A1 * | 10/2024 | Rao | ......................... G01S 19/41 |
| 2025/0224234 | A1 | 7/2025 | Lemonds et al. | |

* cited by examiner

*Primary Examiner* — Tung X Le
(74) *Attorney, Agent, or Firm* — Hawley Troxell; Rivkah Young

(57) ABSTRACT

A digital compass device is provided that is capable of communicating with other digital compass devices without requiring use of cellular or Wi-Fi networks. The digital compass device gathers location data via GPS signals and uses radio signals to create a mesh network which is capable of relaying information across all nodes in the mesh network. The digital compass device can be held in a user's hand, attached to clothing or personal items, and/or worn as an accessory. The front face of the digital compass device displays LED lights, which are capable of showing a user the location of other users, displaying text messages, alerts, notifications, light effects and/or animations. The digital compass device is able to pair with an external application, such as a mobile device application, which provides access to a number of additional features.

20 Claims, 17 Drawing Sheets

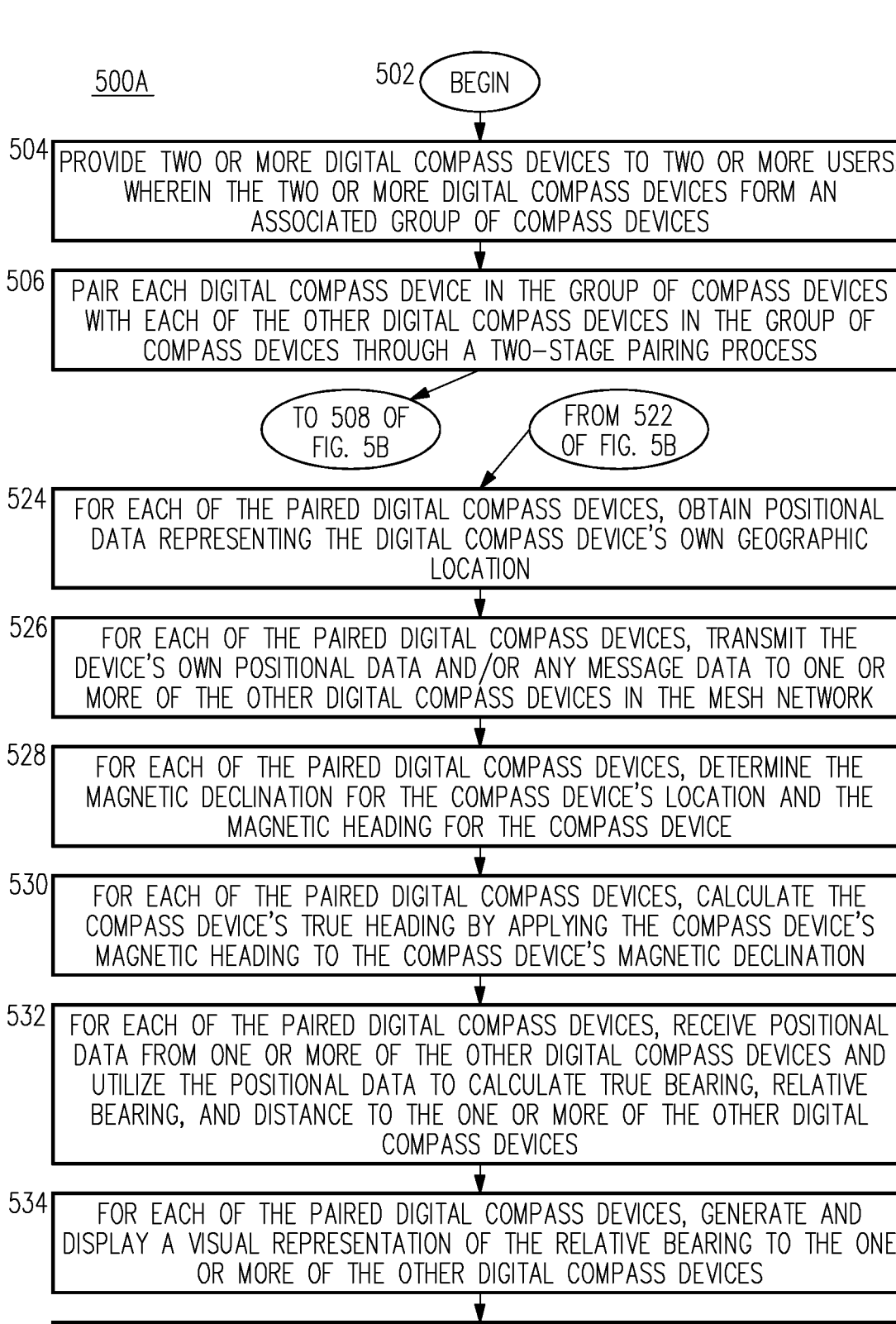

500A

502 BEGIN

504 PROVIDE TWO OR MORE DIGITAL COMPASS DEVICES TO TWO OR MORE USERS, WHEREIN THE TWO OR MORE DIGITAL COMPASS DEVICES FORM AN ASSOCIATED GROUP OF COMPASS DEVICES

506 PAIR EACH DIGITAL COMPASS DEVICE IN THE GROUP OF COMPASS DEVICES WITH EACH OF THE OTHER DIGITAL COMPASS DEVICES IN THE GROUP OF COMPASS DEVICES THROUGH A TWO-STAGE PAIRING PROCESS

TO 508 OF FIG. 5B

FROM 522 OF FIG. 5B

524 FOR EACH OF THE PAIRED DIGITAL COMPASS DEVICES, OBTAIN POSITIONAL DATA REPRESENTING THE DIGITAL COMPASS DEVICE'S OWN GEOGRAPHIC LOCATION

526 FOR EACH OF THE PAIRED DIGITAL COMPASS DEVICES, TRANSMIT THE DEVICE'S OWN POSITIONAL DATA AND/OR ANY MESSAGE DATA TO ONE OR MORE OF THE OTHER DIGITAL COMPASS DEVICES IN THE MESH NETWORK

528 FOR EACH OF THE PAIRED DIGITAL COMPASS DEVICES, DETERMINE THE MAGNETIC DECLINATION FOR THE COMPASS DEVICE'S LOCATION AND THE MAGNETIC HEADING FOR THE COMPASS DEVICE

530 FOR EACH OF THE PAIRED DIGITAL COMPASS DEVICES, CALCULATE THE COMPASS DEVICE'S TRUE HEADING BY APPLYING THE COMPASS DEVICE'S MAGNETIC HEADING TO THE COMPASS DEVICE'S MAGNETIC DECLINATION

532 FOR EACH OF THE PAIRED DIGITAL COMPASS DEVICES, RECEIVE POSITIONAL DATA FROM ONE OR MORE OF THE OTHER DIGITAL COMPASS DEVICES AND UTILIZE THE POSITIONAL DATA TO CALCULATE TRUE BEARING, RELATIVE BEARING, AND DISTANCE TO THE ONE OR MORE OF THE OTHER DIGITAL COMPASS DEVICES

534 FOR EACH OF THE PAIRED DIGITAL COMPASS DEVICES, GENERATE AND DISPLAY A VISUAL REPRESENTATION OF THE RELATIVE BEARING TO THE ONE OR MORE OF THE OTHER DIGITAL COMPASS DEVICES

536 FOR EACH OF THE PAIRED DIGITAL COMPASS DEVICES, DISPLAY ANY MESSAGES RECEIVED FROM EACH OF THE OTHER DIGITAL COMPASS DEVICES

538 END

BATMAN
100m

703

700E

707

709

Batman – 100m

703

700D

METHOD AND SYSTEM FOR ENABLING LOCATION FINDING AND MESSAGE COMMUNICATION BETWEEN A PLURALITY OF DIGITAL COMPASS DEVICES

BACKGROUND

Every year, millions of people engage in a wide variety of social activities, such as attending large gatherings and events or participating in outdoor group activities. Some frequently attended large social gatherings/events include events such as music festivals, art festivals, camping events, conferences, and retreats. Some outdoors group activities often engaged in include activities such as hiking, biking, horse riding, skiing, camping, boating, and paragliding. Many people engage in these types of activities multiple times per year, and often participate in these activities with a group of friends.

During some events, such as music festivals, which may have thousands or even tens of thousands of attendees, people in a group inevitably get separated throughout the course of the event. For instance, some members of a group may want to go to a different stage or event location than other members of the group, while some members might want to go back to their campsite or lodging area earlier than other members. In some cases, group members may get separated unintentionally. With outdoor group activities, which may occur in relatively remote areas, it can often be easy for members of a group to get separated from one another.

Currently, it can be very difficult to easily and efficiently locate and reunite with group members once separated. Many people who find themselves separated from their group in a large crowd or in remote areas worry for their personal safety or for the safety of their friends. Thus, group separation can cause a great deal of stress for activity participants, often ruining their enjoyment of the activity experience.

Currently available methods for staying connected with a group during large gatherings or other activities rely heavily on use of cell phones. Unfortunately, cell phones have a large number of drawbacks in many common activity and event settings. For example, many gatherings and events are held in remote locations where it can be difficult to get cell reception. Further, even if cell reception is otherwise possible, cell networks can easily get overloaded by crowds at large events. Thousands of people may be using a single cell tower, or a very limited number of cell towers. This means that text messages, voice/video calls, and other traditional means of communication via SMS, phone networks, or the internet are unreliable or sometimes non-existent. Messages and calls may not go through as intended, and if messages are sent, there's often a very long delay before the message is received by the intended party.

Additionally, many people do not like to use their phones during activities and events. Phones can be expensive and there is often a worry that a phone might get lost, stolen, or broken. Further, many people feel that using their phone during an activity or event takes away from the quality of the experience, and prefer not to be distracted by online messages, social media, and mobile applications during the experience. Further still, while one person in a group might have a phone with the ability to send messages, others in the group might not have a working phone, and so communication capabilities among all members of the group may be insufficient.

During large festivals in particular, another alternative to using cell phones is the use of "totems" which are essentially big signs on a stick. Clearly this method of locating group members within a crowd is highly inconvenient, as the signs tend to be big, bulky and difficult to store, carry, and use. Other electronics products that attempt to solve the problem of easily, effectively, and reliably locating and communicating with members of a group in crowded and/or remote settings require pairing with a smartphone, are expensive, inconvenient, difficult to use, bulky and/or fragile, ugly, and/or do not provide messaging/alert capabilities and other additional features that enhance the event experience. Further, many such products lack the ability to provide adequate range in areas with dense crowds of people, due in part to a failure to account for water attenuation.

What is needed therefore is a technical solution to the long-standing technical problems associated with easily, cheaply, effectively, and reliably locating and communicating with members of a group in crowded and/or remote settings without requiring use of cellular or Wi-Fi networks.

SUMMARY

Embodiments of the present disclosure provide technical solutions to the long-standing technical problems associated with easily, cheaply, effectively, and reliably locating and communicating with members of a group in crowded and/or remote settings without requiring use of cellular or Wi-Fi networks.

The disclosed embodiments include a digital compass device capable of communicating with other digital compass devices without requiring use of cellular or Wi-Fi networks. In various embodiments, the digital compass device gathers location data via GPS signals and uses radio signals to create a mesh network which is capable of relaying information across all nodes in the mesh network. This provides a unique solution to the technical problems associated with communications in crowded and/or remote areas because, as noted above, most large events and gatherings have limited or no cell/Wi-fi service due to being held in a rural location and/or in a location where several thousand people are using one cell tower, meaning users cannot contact each other through typical means of talk, text, and other cell phone messaging.

In one embodiment, the digital compass device is targeted for people who attend music festivals, but in other embodiments the digital compass device can be used by anyone attending events/gatherings with large crowds or in environments with limited service, such as but not limited to, art festivals, camping events, conferences, and retreats. The digital compass device can also be used by people engaging in outdoor group activities such as, but not limited to, hiking, biking, horse riding, skiing, camping, boating, and paragliding. In one embodiment, the digital compass device is ideally suited for use in emergency situations when other methods of communication may not be readily available.

In addition to the above-described use cases, in some embodiments, the digital compass devices can also be used for network telemetry purposes. For example, the devices may be used to collect, measure and analyze data related to the behavior of a wide variety of networked systems, including but not limited to networked systems of ocean buoys or networked systems of oil field equipment.

In one embodiment, the digital compass device is similar in size and shape to a hockey puck, and can be held in a user's hand, attached to clothing or personal items, and/or worn as an accessory. In one embodiment, the front face of the digital compass device displays light-emitting diode (LED) lights, which are capable of showing a user the location of other users. In one embodiment, the LED lights are also utilized to display text messages, alerts, notifications, light effects, and/or animations. In one embodiment, the digital compass device includes a speaker and is able to provide music, sound effects, audio notifications and/or alerts to the user. In one embodiment, the digital compass device includes a microphone and is able to record audio, accept voice commands, and/or create a sound reactive light show/visualizer. In one embodiment, the digital compass device includes various buttons to control device functionality.

In various embodiments, two or more users each have their own digital compass device, and they are able to pair their devices together to create an encrypted group communications channel. In one embodiment, once paired, each member of the group is assigned a unique color. In one embodiment, by looking at their own device, a user can see the location of the other group members (i.e. the location of the other paired devices) relative to themselves. In one embodiment, the center of the front face of the digital compass device represents the user's location, and the other group members are displayed on the front face of the device as colored LEDs positioned relative to how far and in what direction those group members are from the user. In various embodiments, the location of the LEDs on the devices will change depending on how the user rotates the digital compass device and depending on where the other group members move to in relation to the user. As such, in one embodiment, the users use the device like a compass, pointing in the direction of the group member that they want to locate.

In some embodiments, each digital compass device can also send messages to the group. In one embodiment, a user is able to press a button on the device to scroll through various types of messages that they can send. In one embodiment, pressing the button again will show a different message, and once the user finds a message they want to send, pushing and holding the same button initiates sending of the message. In one embodiment, the digital compass device gives the user a confirmation that the message has been sent. In one embodiment, upon a user sending the message, the digital compass devices of the other group members will flash the user's color, while simultaneously scrolling the text of the message.

In some embodiments, the digital compass device is able to zoom in and out at multiple zoom levels and communicate the zoom level distance information to the user. In some embodiments, LEDs on the display of the digital compass device are able to provide light show effects that are capable of being synchronized across multiple devices.

In some embodiments, the digital compass device is able to pair with an external application, such as a mobile application, which provides access to a number of additional features such as, but not limited to, enhanced message sending, public and emergency broadcast channels, device lighting effects customizations, advanced group management capabilities, social media platform and community engagement features, integrated event-specific features, and remote firmware updates.

The disclosed embodiments include technical solutions to a variety of technical problems associated with easily, cheaply, effectively, and reliably locating and communicating with members of a group in crowded and/or remote settings without requiring use of cellular or Wi-Fi networks. The various technical problems addressed by the disclosed embodiments include problems related to efficiently pairing multiple digital compass devices with multiple other digital compass devices, connecting the paired digital compass devices in a mesh network, providing adequate encryption protocols, providing the digital compass devices with radio communication capabilities beyond line of sight, providing the digital compass devices with the ability to locate the positions of other devices, sharing the positions of the other devices to the mesh network, and calculating distances and relative bearings of other devices in the mesh network. The disclosed embodiments further provide custom solutions to technical problems associated with smoothly rendering device bearing and distance information to a display of each digital compass device in the mesh network, including synchronization of lighting effects between the digital compass devices. The disclosed embodiments further provide solutions for allowing the digital compass devices to send and receive messages over a private channel, with or without use of a screen, and additionally including a public channel for receiving broadcast, emergency, and event announcements while minimizing radio bandwidth usage. In addition, the disclosed embodiments provide custom solutions to technical problems associated with digital compass device calibration, power regulation, firmware updates, threading, and other hardware and software issues.

Consequently, embodiments of the present disclosure provide technical solutions to the long-standing technical problems associated with easily, cheaply, effectively, and reliably locating and communicating with members of a group in crowded and/or remote settings without requiring use of cellular or Wi-Fi networks.

BRIEF DESCRIPTION OF THE DRAWINGS

FIG. 5A is a flowchart of a process for enabling location finding and message communication between a plurality of digital compass devices, in accordance with one embodiment.

Figure 1A:
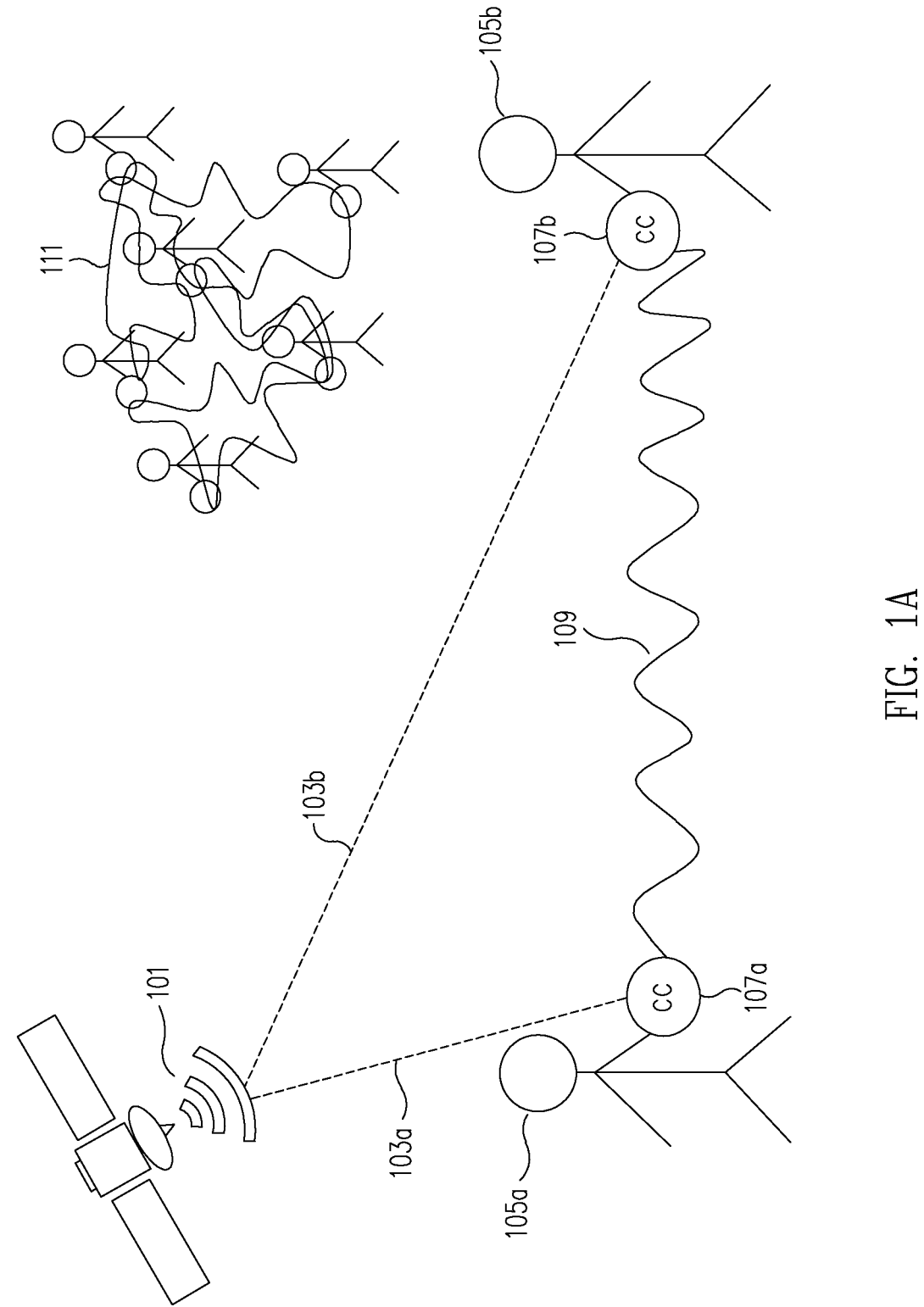
FIG. 1A is a simplified system overview diagram showing the creation of a mesh network, in accordance with one embodiment.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

As noted above, embodiments of the present disclosure provide technical solutions to long-standing technical problems associated with easily, cheaply, effectively, and reliably locating and communicating with members of a group in crowded and/or remote settings without requiring use of cellular or Wi-Fi networks. The disclosed embodiments include a digital compass device capable of locating and communicating with a plurality of other digital compass devices without requiring use of cellular or Wi-Fi networks. In various embodiments, the digital compass devices gather positional data via GPS signals and use radio signals to create a mesh network which is capable of relaying positional data and message data across all nodes in the mesh network. In one embodiment, the digital compass device can be held in a user's hand, attached to clothing or personal items, and/or worn as an accessory. In one embodiment, the front face of the digital compass device displays LED lights, which are capable of showing a user the location of other users, displaying text messages, alerts, notifications, light effects, and/or animations. In some embodiments, the digital compass device is able to pair with an external application, such as a mobile application, which provides access to a number of additional features such as, but not limited to, enhanced message sending, public and emergency broadcast channels, device lighting effects customizations, advanced group management capabilities, social media platform and community engagement features, integrated event-specific features, and remote firmware updates.

System and Hardware

FIG. 1A is a simplified system overview diagram 100A showing the creation of a mesh network, in accordance with one embodiment.

As shown in FIG. 1A, in one embodiment, a first user 105a is in possession of a first compass device 107a, and a second user 105b is in possession of a second compass device 107b. In one embodiment, first compass device 107a receives a first compass device GPS signal 103a from a plurality of GPS satellites, such as GPS satellite 101, to acquire location data for first user 105a's location. In one embodiment, second compass device 107b receives a second compass device GPS signal 103b from a plurality of GPS satellites, such as GPS satellite 101, to acquire location data for second user 105b's location. In one embodiment, once first compass device 107a has acquired its own location data (which is the location of first user 105a) and second compass device 107b has acquired its own location data (which is the location of second user 105b), first compass device 107a and second compass device 107b communicate their respective locations to each other via radio signal 109. In various embodiments, multiple additional compass devices communicate via radio signal 109 to create mesh network 111, such that each compass is able to get the location of the other compasses from information relayed across all nodes (devices) in mesh network 111.

Figure 1B:
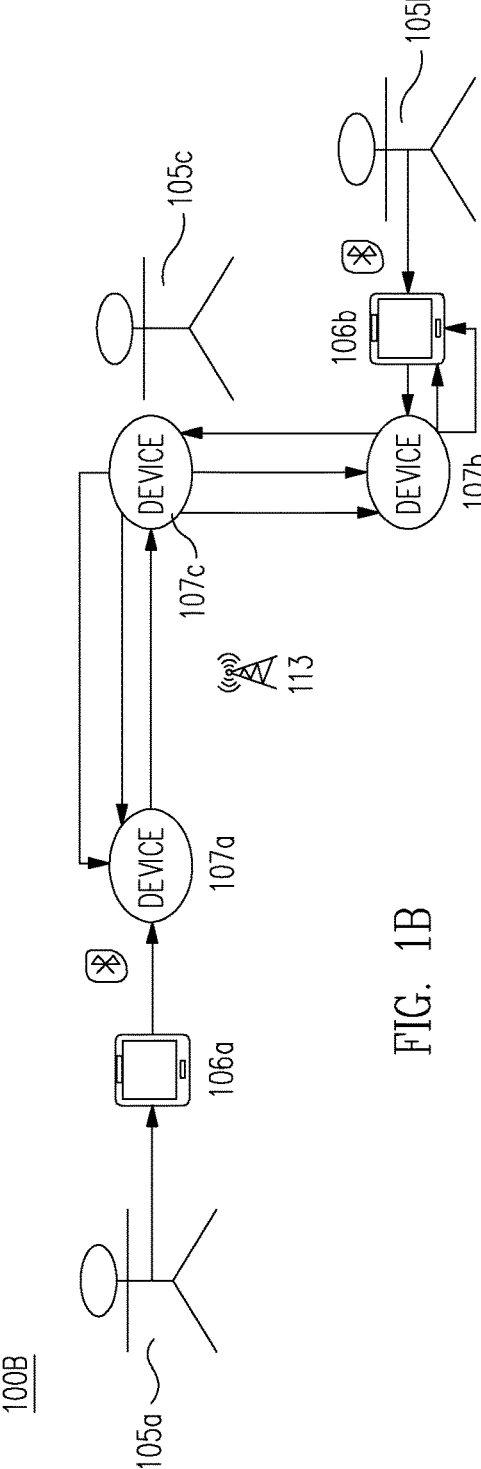
FIG. 1B is a simplified system diagram illustrating the mesh network concept for users with cellular devices, in accordance with one embodiment.

FIG. 1B is a simplified system diagram 100B illustrating the mesh network concept for users with cellular devices, in accordance with one embodiment.

As shown in the illustrative example of FIG. 1B, in one embodiment, first user 105a is in possession of both first mobile phone 106a and first compass device 107a, second user 105b is in possession of both second mobile phone 106b and second compass device 107b, and third user 105c is not in possession of a mobile phone but is in possession of third compass device 107c. In one embodiment, first mobile phone 106a communicates with first compass device 107a via a mobile application on first mobile phone 106a. Likewise, in one embodiment, second mobile phone 106b communicates with second compass device 107b via a mobile application on second mobile phone 106b.

In the illustrative example of FIG. 1B, first user 105a utilizes first mobile phone 106a to create a message and then utilizes first compass device 107a to send the message over radio network 113 to second user 105b via the third compass device 107*c* of third user 105*c*. In this illustrative example, the range is not long enough for the message to travel from first user 105*a* to second user 105*b*, and so a mesh style network is used to relay the message to second user 105*b* via third compass device 107*c* of third user 105*c*. In one embodiment, upon receipt of the message created by first user 105*a*, second user 105*b* is able to view the message either on a display of second compass device 107*b*, or via the mobile application on second mobile phone 106*b*, depending on what is most convenient for the user. In one embodiment, third user 105*c* is not in possession of a mobile phone, and so can view the text message on a display of third compass device 107*c*.

It should be noted here that while the term "mobile phone" is used for simplicity in the above illustrative example, any type of device capable of communicating information to and/or receiving information from, a digital compass device could be used for this purpose, as would be known by those of skill in the art. Additional details related to features that may be provided by a digital compass application on a device, such as a mobile phone, will be discussed further below.

In one embodiment, first user device 107*a* also transmits user 105*a*'s location data to third user device 107*c* of third user 105*c*, and third compass device 107*c* of third user 105*c* relays first user 105*a*'s message and location data to second user 105*b*. At the same time, third compass device 107*c* of third user 105*c* sends its own location data to both first user 105*a* and second user 105*b*, and third compass device 107*c* of third user 105*c* also relays second user 105*b*'s location to first user 105*a*.

Figure 1C:
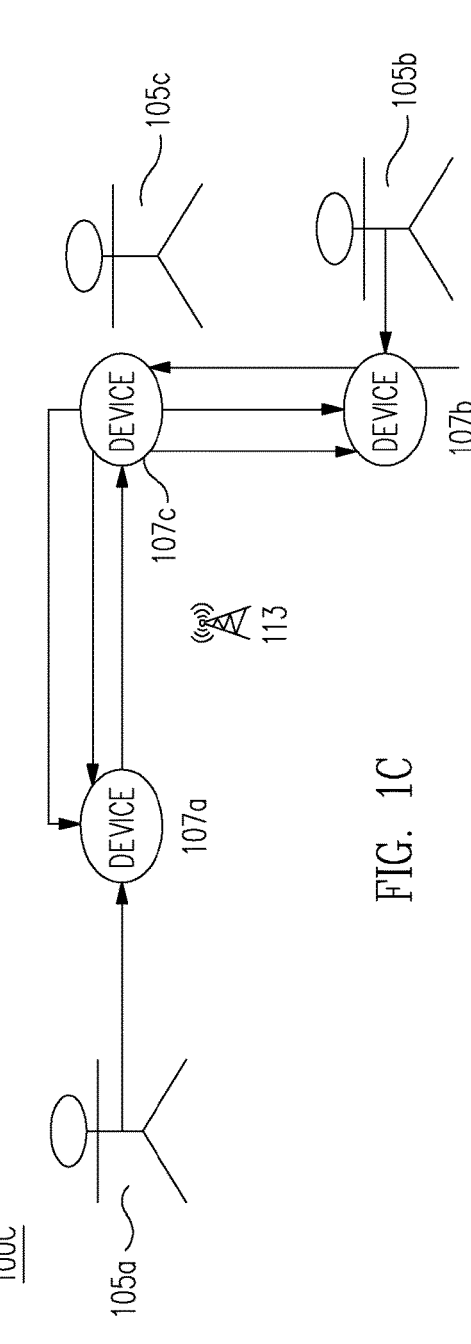
FIG. 1C is a simplified system diagram illustrating the mesh network concept for users without cellular devices, in accordance with one embodiment.

FIG. 1C is a simplified system diagram 100C illustrating the mesh network concept for users without cellular devices, in accordance with one embodiment.

As shown in the illustrative example of FIG. 1C, in one embodiment, first user 105*a* is in possession of first compass device 107*a*, second user 105*b* is in possession of second compass device 107*b*, and third user 105*c* is in possession of third compass device 107*c*.

In the illustrative example of FIG. 1C, first user 105*a* sends a message from first compass device 107*a* over radio network 113 to second user 105*b* via the third compass device 107*c* of third user 105*c*. In this example, the range is not long enough for the message to travel from first user 105*a* to second user 105*b*, and so a mesh style network is used to relay the message to second user 105*b* via third compass device 107*c* of third user 105*c*. In one embodiment, first user device 107*a* also transmits user 105*a*'s location data to third user device 107*c* of third user 105*c*, and third compass device 107*c* of third user 105*c* relays first user 105*a*'s message and location data to second user 105*b*. At the same time, third compass device 107*c* of third user 105*c* sends its own location data to both first user 105*a* and second user 105*b*, and third compass device 107*c* of third user 105*c* also relays second user 105*b*'s location to first user 105*a*.

The illustrative example of FIG. 1C highlights that while devices, such as mobile phones, can be used alongside of the disclosed digital compass device, a separate device is not needed to utilize the core functionality of the digital compass device. In FIG. 1C, none of the users is in possession of a separate device, such as a mobile phone, however the devices are all still able to relay message and location data to each other across the mesh network.

As noted above, one technical problem solved by the disclosed embodiments relates to connecting digital devices in a mesh network and providing the digital devices with radio communication capabilities beyond line of sight.

In one embodiment, these technical problems are solved by utilizing a long range (LoRa) radio and specific LoRa antenna to connect two or more devices in a mesh network topology over 915 MHZ band using the LoRa protocol, as will be discussed in additional detail below. This enables line of sight range of up to or over 3 miles. In one embodiment, when one node/device in the network receives a message, it rebroadcasts the message back out to the mesh. In one embodiment, the number of rebroadcasts of a message is configurable. In one embodiment, each message is rebroadcast 3 times. In one embodiment, if a device sees a message that it has already rebroadcast, the device does not rebroadcast the message. This enables communication beyond line of sight since node A (first compass device 107*a*) and node B (second compass device 107*b*) might not see each other, but they both see node C (third compass device 107*c*) and therefore node C can relay their communications.

Figure 2:
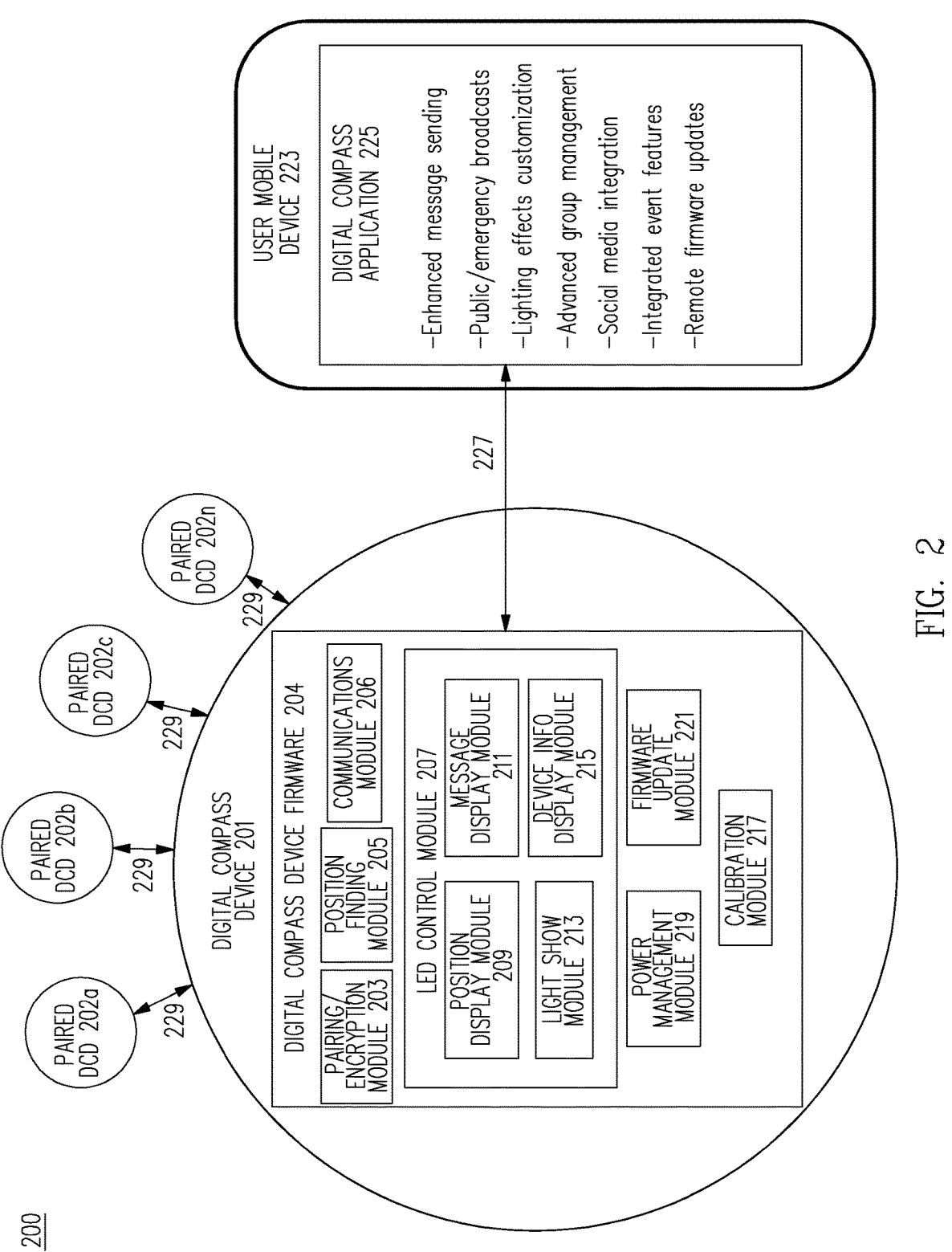
FIG. 2 is a diagram of a system for enabling location finding and message communication between a plurality of digital compass devices, in accordance with one embodiment.

FIG. 2 is a diagram of a system 200 for enabling location finding and message communication between a plurality of digital compass devices, in accordance with one embodiment.

As shown in FIG. 2, in one embodiment, system 200 includes digital compass device 201 and paired digital compass device (DCD) 202*a*, 202*b*, and 202*c* through 202*n*. In one embodiment, digital compass device 201 includes digital compass device firmware 204, which further includes pairing/encryption module 203, position finding module 205, communications module 206, LED control module 207, calibration module 217, power management module 219, and firmware update module 221. In one embodiment, LED control module 207 incudes position display module 209, message display module 211, light show module 213, and device info display module 215.

In one embodiment, system 200 optionally includes user mobile device 223, which includes digital compass application 225. In one embodiment digital compass application 225 provides a variety of additional features such as, but not limited to, enhanced message sending, public and emergency broadcast channels, device lighting effects customizations, advanced group management capabilities, social media platform and community engagement features, integrated event-specific features, and remote firmware updates.

In one embodiment, digital compass application 225 and digital compass device 201 communicate over one or more first communications networks 227, such as but not limited to, wired networks, short-range wireless networks (e.g., Bluetooth), or Wi-fi networks. In one embodiment, digital compass device 201 communicates with paired digital compass devices 202*a*, 202*b*, 202*c* through 202*n* over one or more second communications networks 229, such as, but not limited to, long range radio communications networks. Each of the above elements will be discussed in additional detail below.

Figure 3A:
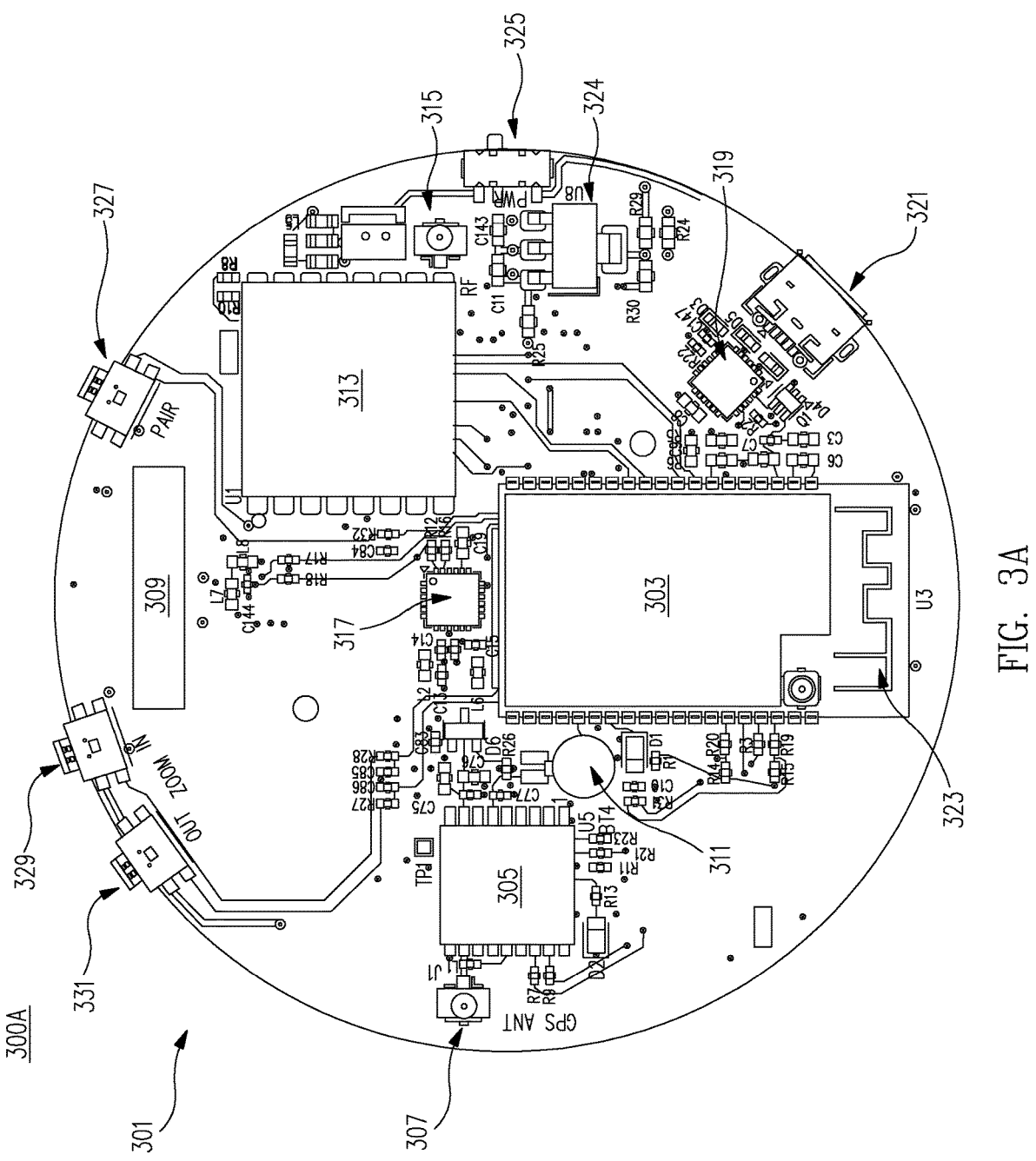
FIG. 3A is an illustrative example of a downward-facing side of a custom printed circuit board (PCB) utilized for enabling location finding and message communication between a plurality of digital compass devices, in accordance with one embodiment.

FIG. 3A is an illustrative example 300A of a downward-facing side of a custom printed circuit board (PCB) utilized for enabling location finding and message communication between a plurality of digital compass devices, in accordance with one embodiment.

As shown in FIG. 3A, in one embodiment, custom PCB 301 includes microcontroller 303, which utilizes compass device firmware to control the operation and interaction of the various hardware device elements discussed herein. In one embodiment, custom PCB 301 utilizes a GPS assembly, which may include one or more of GPS chip 305, GPS antenna connection point 307, GPS antenna (not shown), and GPS backup battery 311. In one embodiment, custom PCB 301 includes GPS antenna cutout 309 within which the GPS antenna (not shown) may be placed. In one embodiment, custom PCB 301 utilizes one or more radio assemblies. In one embodiment, a radio assembly may include LoRa radio 313, LoRa antenna connection point 315, and LoRa antenna (not shown). In one embodiment, a radio assembly may be a short-range radio assembly including an antenna, such as Bluetooth antenna 323 and other related hardware components. In one embodiment, custom PCB 301 also includes gyroscope and accelerometer chip 317, USB (Universal Serial Bus) to UART (Universal Asynchronous Receiver/Transmitter) conversion chip 319, USB port 321, power regulator 324, power switch 325, pairing button 327, zoom in button 329, and zoom out button 331. Each of these elements will be discussed in additional detail below.

As used herein the term "assembly" refers to a collection of elements that work together to perform a related function. The elements that make up an assembly may or not be directly physically coupled. The elements that make up an assembly may be electrically coupled or simply positioned such that they are able to work together to perform their intended function (e.g. the GPS assembly and the radio assemblies discussed above).

Figure 3B:
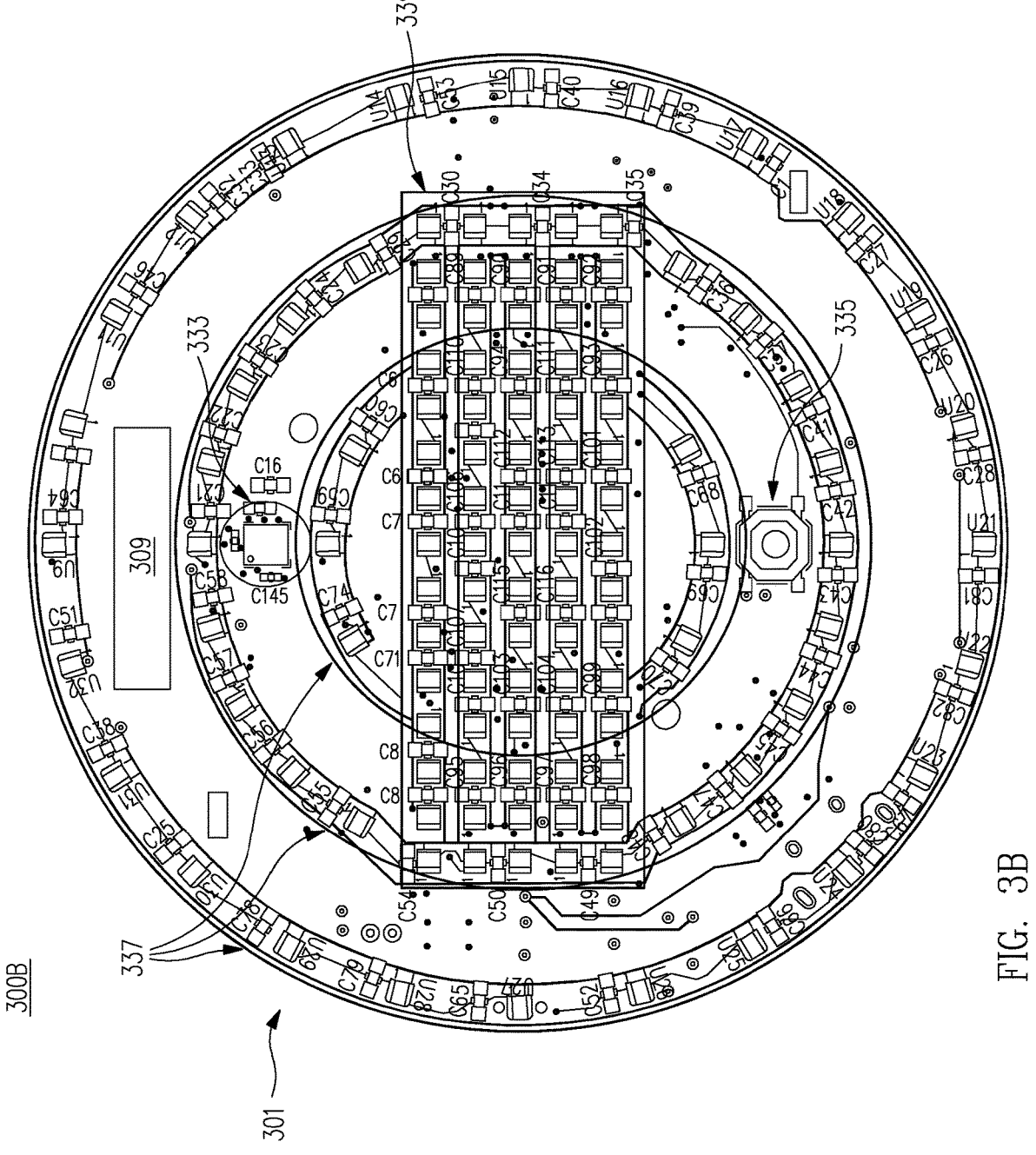
FIG. 3B is an illustrative example of an upward-facing side of a custom printed circuit board (PCB) utilized for enabling location finding and message communication between a plurality of digital compass devices, in accordance with one embodiment.

FIG. 3B is an illustrative example 300B of an upward-facing side of a custom printed circuit board (PCB) utilized for enabling location finding and message communication between a plurality of digital compass devices, in accordance with one embodiment.

As shown in FIG. 3B, in one embodiment, custom PCB 301 includes magnetometer chip 333, action button 335, one or more concentric LED rings 337, and LED matrix 339, Each of these elements will be discussed in additional detail below.

Figures 4A, 4B:
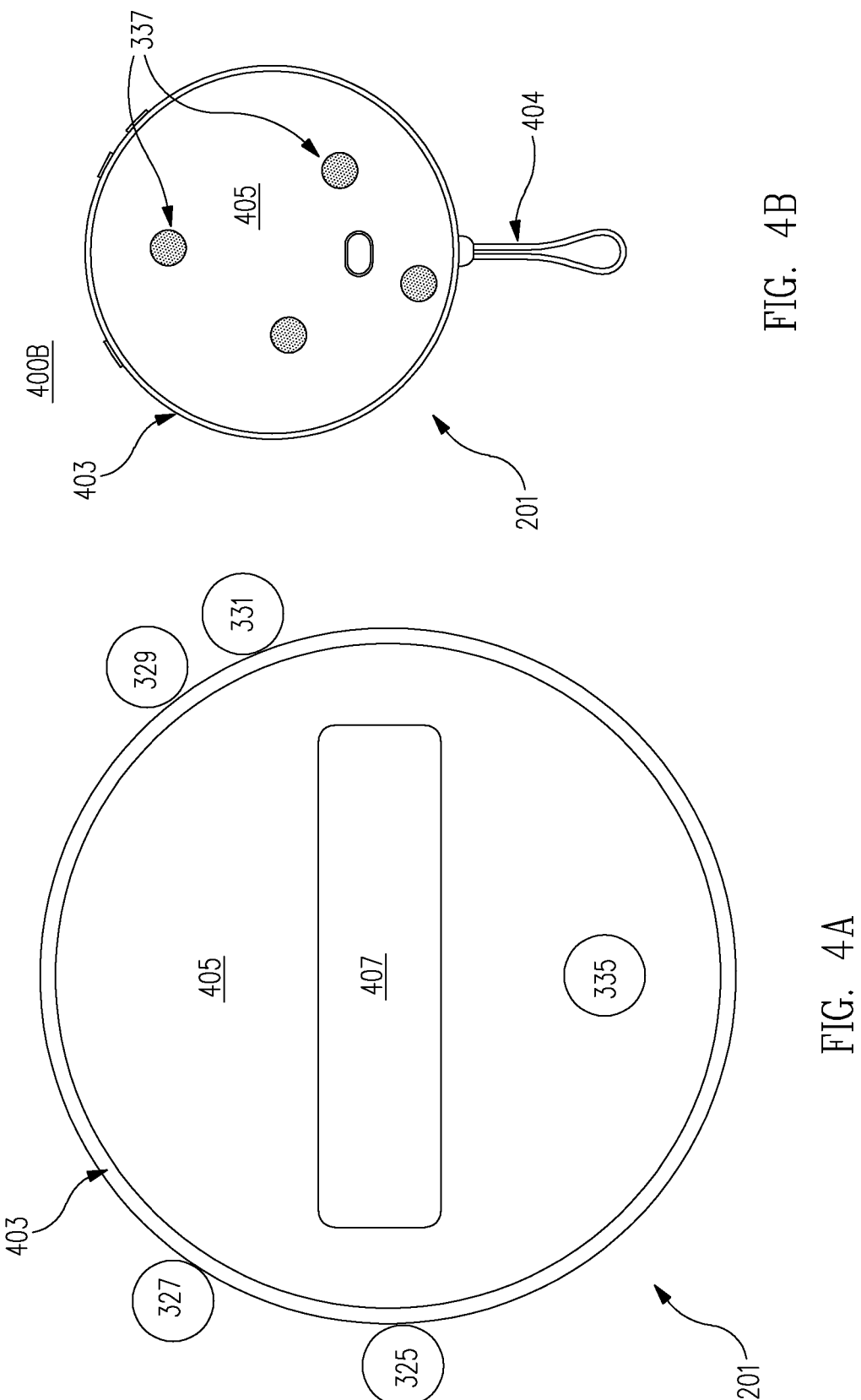
FIG. 4A is a diagram showing a placement of functional elements of a digital compass device, in accordance with one embodiment.
FIG. 4B is an illustrative photograph of a digital compass device that has been paired with four other devices, in accordance with one embodiment.

FIG. 4A is a diagram 400A showing a placement of functional elements of digital compass device 201, in accordance with one embodiment.

In one embodiment, digital compass device 201 includes compass device shell 403, LED compass display 405, LED matrix display 407, action button 335, power switch 325, pairing button 327, zoom in button 329, and zoom out button 331.

Referring now to FIG. 3A, FIG. 3B, and FIG. 4A together, in one embodiment compass device shell 403 houses custom PCB 301, which includes microcontroller 303 and all other device hardware discussed and disclosed herein. In one embodiment, LED compass display 405 utilizes concentric LED rings 337 to display the location of other paired digital compass devices. In one embodiment, LED matrix display 407 utilizes LED matrix 339 to display messages, notifications, alerts, animations, and light shows. In one embodiment, concentric LED rings 337 of LED compass display 405 and the LED matrix 339 of LED matrix display 407 are blended so that they work together to display the location of other paired digital compass devices, as well as messages, notifications, alerts, animations, and light shows. Each of these display elements will be discussed in additional detail below.

In one embodiment, action button 335 performs various functions, such as, but not limited to, allowing the user to choose an alert or message to send, send an alert or message, or to close a received alert or message notification. In one embodiment power switch 325 turns digital compass device 201 on or off. In one embodiment, pushing and holding pairing button 327 causes digital compass device 201 to enter a pairing mode. In one embodiment zoom in button 329 allows the user to zoom in on the LED compass display 405. In one embodiment, when the LED compass display is already zoomed in fully, zoom in button 329 allows digital compass device 201 to enter "Hold/Cold" mode, which will be discussed in additional detail below. In one embodiment, digital compass device 201 is able to be set to a "party mode" (which will be discussed below), and while in "party mode," zoom in button 329 allows the user to change the type of party mode. In one embodiment zoom out button 331 allows the user to zoom out on LED compass display 405. In one embodiment, when the digital compass device 201 is in "Hot/Cold" mode, zoom out button 331 allows digital compass device 201 to exit "Hold/Cold" mode. In one embodiment, when digital compass device 201 is in "party mode," zoom out button 331 allows the user to change the type of party mode.

In one embodiment, pushing and holding pairing button 327, zoom in button 329, and zoom out button 331 together resets digital compass device 201. In one embodiment, pushing and holding pairing button 327, zoom in button 329, and zoom out button 331 together causes digital compass device 201 to leave the group that it is currently paired with. In one embodiment, clicking zoom in button 329 and zoom out button 331 together allows digital compass device 201 to enter information mode, which displays device information to the user, such as, but not limited to, battery life and LED color settings. In one embodiment, shaking digital compass device 201 switches digital compass device in and out of "party mode." These additional features will be discussed in further detail below.

It should be noted herein that the above examples of button placements and functionality are provided for illustrative purposes only. It should be clear to one of skill in the art, that any number of buttons, switches, button placements, and button press combinations can be utilized to achieve the intended results. For example, in one embodiment, the digital compass device has a power slider and pairing button on the outside of the device, but no zoom buttons. In various other embodiments, pressing one or more of the buttons together may activate functionality other than that described above.

FIG. 4B is an illustrative photograph 400B of a digital compass device 201 that has been paired with four other devices and is showing the location of the four other devices (relative to the user, who is positioned in the center) on the LED compass display 405, in accordance with one embodiment.

Referring to FIG. 3B, FIG. 4A, and FIG. 4B together, in one embodiment, each paired device may be assigned a unique LED color, and the particular LED of concentric LED rings 337 that is lit up is determined based on the location of the associated compass device, as will be discussed in additional detail below. In one embodiment, digital compass device 201 utilizes concentric LED rings 337, but does not utilize LED matrix 339 or LED matrix display 407. Additional variations of the functional elements of digital compass device 201 will be discussed below. In one embodiment, digital compass device includes one or more accessories, such as loop 404, which may be utilized to secure digital compass device 201 to a user's person, clothing, or other personal effects.

Figure 4C:
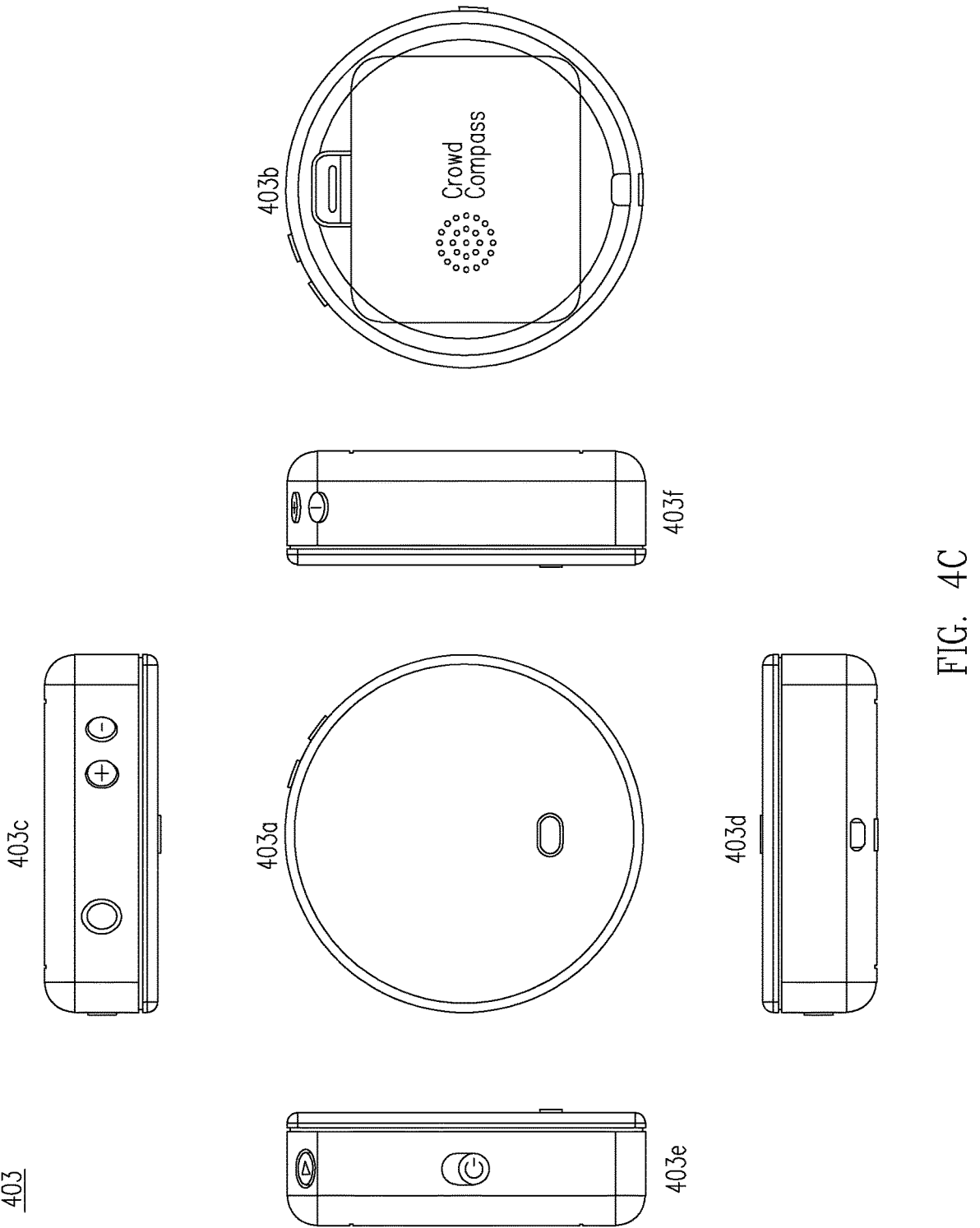
FIG. 4C is an illustrative example of a compass device shell, shown from different angles, in accordance with one embodiment.

FIG. 4C is an illustrative example of compass device shell 403, shown from different angles, in accordance with one embodiment. The views of compass device shell 403 depicted in FIG. 4C include front shell 403*a*, back shell 403*b*, top shell 403*c*, bottom shell 403*d*, left shell 403*e*, and right shell 403*f*, in accordance with one embodiment. In various embodiments, compass device shell 403 is designed to be waterproof, water-resistant, and/or dustproof.

Figure 4D:
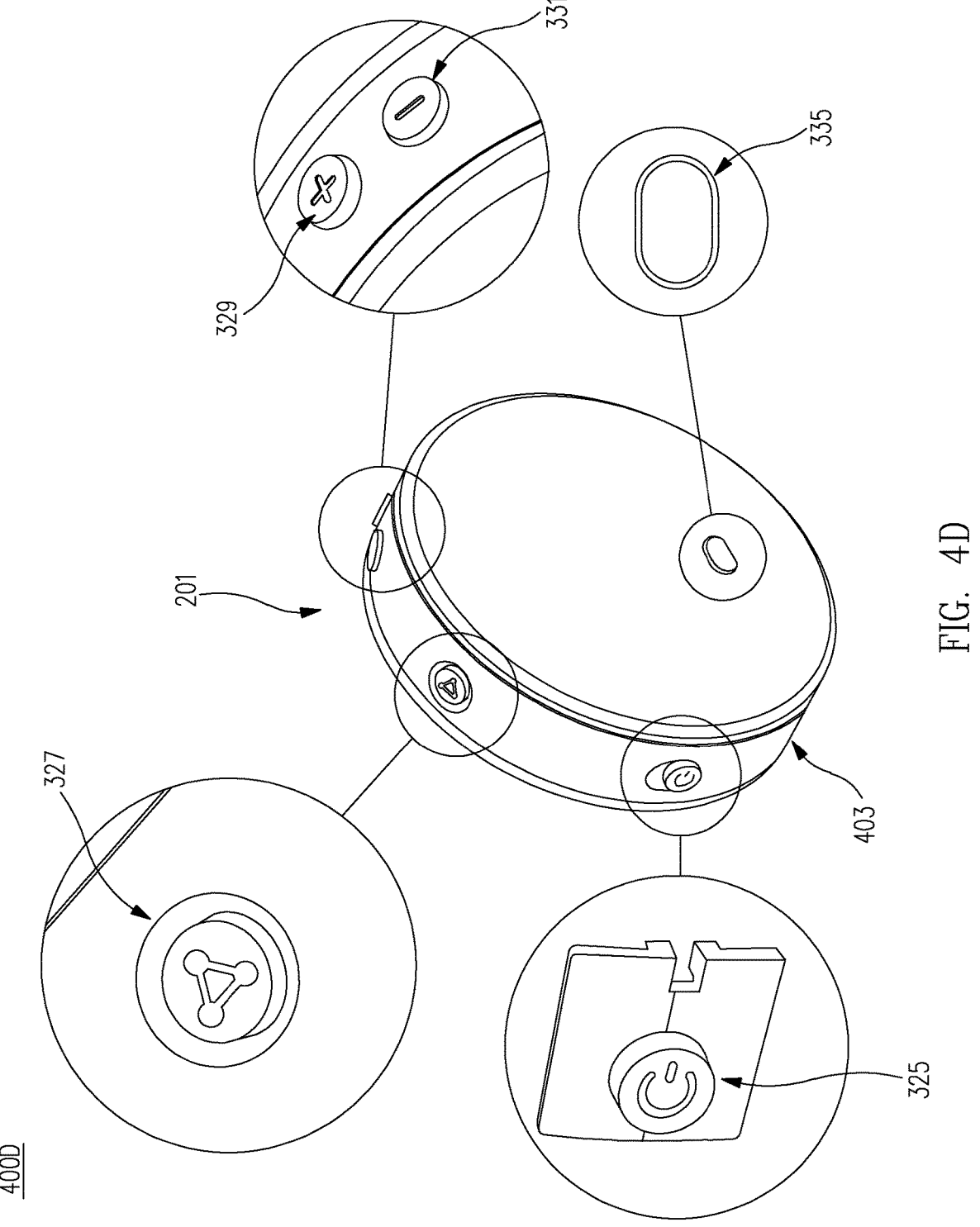
FIG. 4D depicts close up views of various interface elements of a compass device shell, in accordance with one embodiment.

FIG. 4D depicts close up views 400D of various interface elements of compass device shell 403 of digital compass device 201, which allow the user to utilize action button 335, power switch 325, pairing button 327, zoom in button 329, and zoom out button 331, in accordance with one embodiment.

Figure 4E:
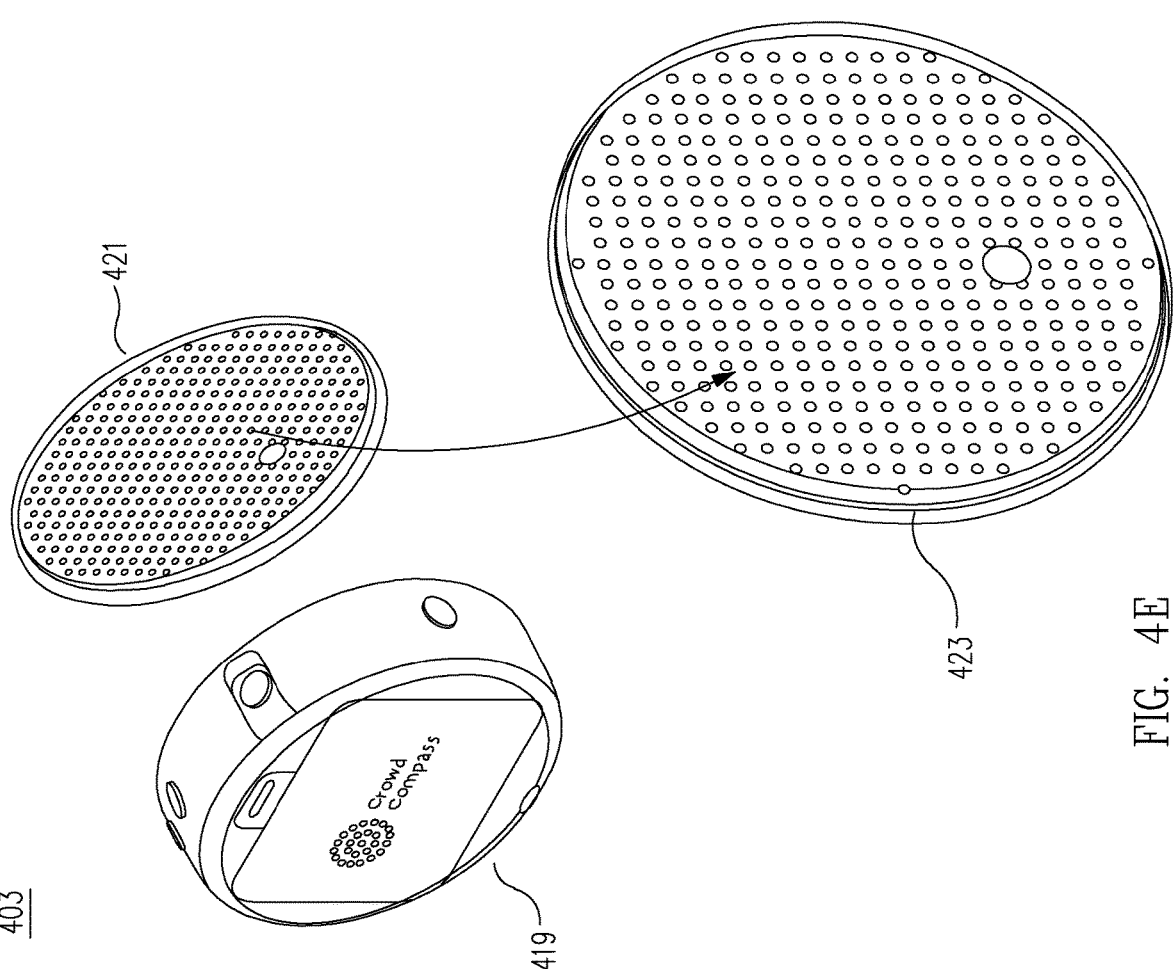
FIG. 4E depicts a compass device shell in an open position, in accordance with one embodiment.

FIG. 4E depicts compass device shell 403 in an open position, in accordance with one embodiment.

Referring to FIG. 3B, FIG. 4A, and FIG. 4E together, in one embodiment compass device shell 403 includes bottom housing portion 419, and top housing portion 421. In one embodiment, custom PCB 301 sits inside bottom housing portion 419 of compass device shell 403, such that the concentric LED rings 337 and the LED matrix 339 face upwards, towards the opening. In one embodiment, when top housing portion 421 of compass device shell 403 is coupled with bottom housing portion 419, and digital compass device 201 is in use, the LEDs of concentric LED rings 337 and LED matrix 339 shine through top housing portion 421 (which may be made from a translucent or other similar material) such that the LEDs are visible to the user through the LED compass display 405 and LED matrix display 407 display areas of digital compass device 201. Each of these lighting elements will be discussed in additional detail below. In one embodiment, the inside of top housing 421 is printed with dot matrix graphic 423, which creates an illusion that the LED matrix is actually much denser than it is. This reduces the number of LEDs needed to provide a more aesthetically pleasing experience for the user. In one embodiment, the interior of top housing portion 421 is not printed with any graphic.

It should be noted that the above discussed figures are provided for illustrative purposes only and are not intended to limit the scope of the invention as disclosed and claimed herein. For instance, while compass device shell 403 as shown in FIG. 4A through FIG. 4E as being about the shape and size of a hockey puck, it should be clear to those of skill in the art that other shapes and sizes of compass device shell could be utilized to achieve the same or similar functionality, as will be discussed in more detail below.

Process

FIG. 5A is a flowchart of a process 500A for enabling location finding and message communication between a plurality of digital compass devices, in accordance with one embodiment.

As shown in FIG. 5A, in one embodiment, process 500A begins at BEGIN operation 502 and then proceeds to operation 504.

In one embodiment, at operation 504, two or more digital compass devices are provided to two or more users, wherein the two or more users form a group of users and the two or more compass devices form an associated group of compass devices.

While it is possible for two or more users to share a single compass device, in order to utilize the digital compass devices as intended, at least two devices need to be activated. A group of users consisting of four users may utilize four devices, one for each user, or larger groups may be split into sub-groups to utilize fewer devices. For example, a group consisting of eight users may split into four sub-groups consisting of two users in each sub-group, with one device being provided for each sub-group. In either of these illustrative scenarios, the group of compass devices associated with the group of users would consist of four compass devices, however in various embodiments, a group of compass devices associated with a group of users can consist of any number of digital compass devices.

It should be noted that throughout the present disclosure, terms such as "group of compass devices," "paired compass devices," "compass devices on the mesh network," and "compass devices on the channel," may be used interchangeably, and for simplicity of disclosure, it will be assumed that each compass device in a group of compass devices is in the possession of one user in a group of users (where the members of the group of users include the owners of compass devices that are paired and utilizing the same channel on the mesh network).

In one embodiment, once two or more digital compass devices have been provided to two or more users at operation 504, process flow proceeds to operation 506. In one embodiment, at operation 506, each digital compass device in the group of compass devices is paired with each of the other digital compass devices in the group of compass devices through a two-stage pairing process.

Referring now to FIG. 2 and FIG. 3A together, in one embodiment, digital compass device firmware 204 includes pairing/encryption module 203, which utilizes Bluetooth antenna 323 of custom PCB 301 to provide various methods for digital compass device 201 to pair with other compass devices, such as paired digital compass devices 202a, 202b, 202c through 202n. In one embodiment, pairing two or more devices enables location finding and message communication between the devices over one or more second communications networks 229, which in one embodiment includes a mesh network, as will be discussed in additional detail below.

As noted above, one technical problem solved by the disclosed embodiments relates to wirelessly pairing multiple digital compass devices while providing adequate encryption protocols to protect the privacy of the device users. In the disclosed embodiments, these technical problems are solved by pairing the digital compass devices in a group together through a specific two-stage pairing process, which ensures that all compass devices that are paired in one group are separated via encryption from all other compass devices on the network that are not part of the group.

Figure 5B:
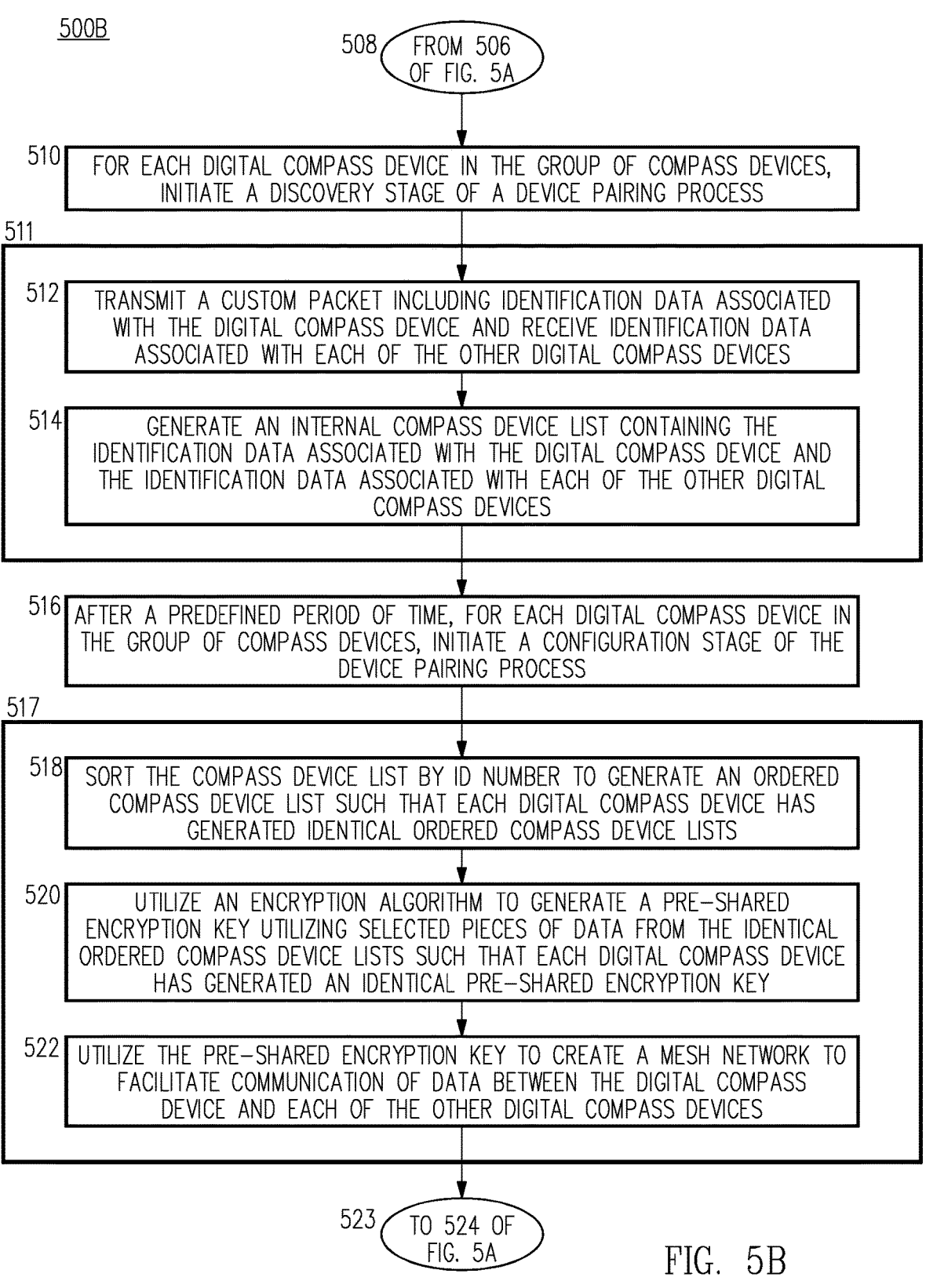
FIG. 5B is a flowchart of a two-stage process for pairing two or more digital compass devices, in accordance with one embodiment.

FIG. 5B is a flowchart of a two-stage process for pairing two or more digital compass devices, in accordance with one embodiment.

Referring to FIG. 5A and FIG. 5B together, in one embodiment, pairing the digital compass devices at operation 506 of FIG. 5A involves a separate sub-process which starts at operation 508 of FIG. 5B and then proceeds to operation 510. In one embodiment, at operation 510, a discovery stage 511 is initiated for each digital compass device in the group of compass devices.

In one embodiment, to begin pairing, all digital compass devices to be paired are located within proximal distance of each other and the user of each compass device to be paired presses and holds a pairing button on the compass device to begin the pairing discovery stage. In various embodiments, the distance between the compass devices could be as far as approximately 50 feet, however in some embodiments, as a safety feature, the power of the Bluetooth signal utilized for pairing is intentionally lowered such that the devices need to be even closer together to discover each other. For example, if an individual wanted to join a group of users by pairing their device to the group without the group's knowledge, this would be easier for them to do undetected at greater distances. Requiring closer proximity reduces the likelihood that nefarious actors will be able to access a group's sensitive location and message data.

In one embodiment, once discovery stage 511 is initiated at operation 510, process flow proceeds to operation 512. In one embodiment, at operation 512, for each digital compass device in the group of compass devices, a custom packet that includes identification data associated with the digital compass device is transmitted and identification data associated with each of the other digital compass devices is received.

In one embodiment the compass devices discover each other through use of Bluetooth beacons. For example, in one embodiment each of the devices in the group transmit a custom Bluetooth packet in their advertising data. Data that may be included as part of the Bluetooth packet may be data such as, but not limited to, a unique ID/node number, the device name, the color assigned to the device user (if any), data indicating whether the device is a digital compass device, and data indicating whether the device is actively looking for other digital compass devices.

In one embodiment, once a device has transmitted its identification data and received identification data from other compass devices at operation 512, process flow proceeds to 514. In one embodiment, at operation 514, each digital compass device in the group of compass devices generates an internal compass device list containing the identification data associated with the digital compass device and the identification data associated with each of the other digital compass devices in the group. As noted above, in various embodiments, the identification data associated with each digital compass device includes an ID number that is unique to each of the individual digital compass devices.

In one embodiment, once each digital compass device has generated their internal compass device list at operation 514, process flow proceeds to operation 516. In one embodiment, at operation 516, after a predefined period of time in discovery stage 511, each of the digital compass devices in discovery stage 511 exit discovery stage 511 and initiate a configuration stage 517 of the device pairing process.

In one embodiment, once the configuration stage 517 of the device pairing process has been initiated at operation 516, process flow proceeds to operation 518. In one embodiment, at operation 518, for each digital compass device in the group of compass devices, the digital compass device sorts their compass device list by ID number to generate an ordered compass device list such that each digital compass device has generated identical ordered compass device lists.

In various embodiments, upon entering the configuration stage, each device has already generated its internal compass list including identifying information for each of the other compass devices. In one embodiment, each device's internal compass list also includes the data for their own device. Sorting this list by unique ID number guarantees that every digital compass device in the group of compass devices ends up generating an ordered list that is identical to the lists built by the other devices in the group of compass devices. In various embodiments, the compass device list may be sorted by a field other than the unique ID number, as long as the data that populates that field is unique to each compass device.

In one embodiment, once identical ordered compass device lists have been generated for each digital compass device at operation 518, process flow proceeds to operation 520. In one embodiment, at operation 520, for each digital compass device in the group of compass devices, an encryption algorithm is utilized to generate a pre-shared encryption key.

In various embodiments, the pre-shared encryption key is generated by each of the digital compass devices using the same encryption algorithm along with selected pieces of data from the identical ordered compass device lists such that each digital compass device has generated an identical pre-shared encryption key. For example, if an encryption key were 32 bytes long, data indicating the color assigned to the first compass device in the ordered compass device list might form byte 1 of the encryption key, while data indicating the color assigned to the last compass device in the ordered compass device list might form byte 32 of the encryption key. The rest of the key may be generated by using various selected bits of data from the ordered compass device list to populate the key. The pre-shared key may then be put through a hashing algorithm, such as the MD5 hashing algorithm, which is well known in the art, to create a final pre-shared key. This process ensures that each digital compass device in the group of compass devices has possession of the same pre-shared key.

In one embodiment, once a pre-shared encryption key is generated at operation 520, process flow proceeds to operation 522. In one embodiment, at operation 522, the pre-shared encryption key is utilized to create a mesh network to facilitate communication of data between the digital compass device and each of the other digital compass devices in the group of compass devices.

In one embodiment, the mesh network is created by selecting specific parameters/settings for each LoRa radio, including selecting a channel to use. In one embodiment, the channel is selected similarly to how the pre-shared key is generated, by utilizing a particular algorithm along with selected bits of data from the ordered compass device lists that are identical for each of the paired digital compass devices. As noted above, since all of the compass devices are using the same algorithm and dataset to select the channel number, this ensures that all of the compass devices in the group are utilizing the same communication channel.

In various embodiments, the LoRa radio has certain parameters/settings that determine what other radios can be listened to (ignoring any pre-shared keys). If two radios are not utilizing the same parameters/settings, then they will never be able to hear each other, despite having the same pre-shared key. Some of these parameters/settings include frequency bandwidth, spread factor, coding rate, and channel number. In one embodiment, each of these settings, with the exception of the channel number, are hard coded into the digital compass devices and are universal to all of the digital compass devices. The channel number may then be selected similarly to the way that the pre-shared encryption key is generated, and the frequency is then calculated based on the channel number and programmed into the radio.

For example, in one embodiment, the entire available spectrum is 26 MHZ wide, and the current frequency bandwidth is set to 500 KHZ (i.e. 0.5 MHZ), which means that 52 channels would be available for use (26 MHZ/.5 MHZ=52). In one embodiment, the devices all use a "secret" and shared formula for determining channel number. During pairing process, the devices build a list of all available compasses discovered in pairing and use this list (the same list for all compasses) to determine channel number. For example, the digital compass devices could sort the compass device list by compass id (i.e. node number) and use the second byte of the node number of the last element in the list with a hashing algorithm that returns a number between 1 and 52. This process is helpful for "dispersing the load" between different channels for different compass groups in a secure way and in a way that evenly distributes channel groups between the 52 channels.

In one embodiment, once the channel number is selected, the specific frequency may be determined by the following formula: freq=902+(freqBand Width/2000)+(channel_num*(freqBandWidth/1000)). For example, if the frequency bandwidth is set to 500 KHZ and channel 20 was selected, the frequency would be calculated as: 902+(500/2000)+(20* (500/1000))=912.25 HZ. It should be noted that the above example is given for illustrative purposes only and is not intended to limit the scope of the invention as disclosed and claimed herein. In various embodiments, other radio settings could be used, and other methods of channel calculation could be implemented, as is known by those of skill in the art.

In one embodiment, once the mesh network has been created at operation 522, configuration stage 517 of the two-stage pairing process is exited and process flow proceeds to operation 523, which then proceeds back to operation 524 of FIG. 5A.

The above-described process of creating a pre-shared key encryption key and mesh network has many advantages over traditional methods of creating and sharing encryption keys. For example, since each compass device uses the same algorithm on the same ordered list to generate the encryption key, it is guaranteed that each device will generate the same encryption key, which means that encryption data does not need to be communicated out to group members via Bluetooth attributes. This also means that a "leader" device does not need to be nominated for exchanging the data. Likewise, the radio channel settings for the mesh network can be generated by each individual compass device separately, while still ensuring that all devices are using the same channel settings.

While the above-described process has been found by the inventors to be a unique and efficient way to pair multiple devices with multiple devices, in some embodiments, more traditional methods may still be used. For example, in one embodiment, once the compass devices have no longer discovered any new compass devices after a certain period of time in the discovery stage, a leader compass device may be chosen.

In one embodiment, once a leader compass device has been chosen, the leader compass device then creates a random encryption key and group ID and shares the encryption key and group ID as Bluetooth service attributes for the follower compass devices (e.g. non-leader compass devices). In one embodiment, the leader compass device then creates a channel using the group ID and encryption key. In one embodiment, the follower compass devices then read the leader compass device's encryption key and group ID from the leader compass device's Bluetooth service attributes. The devices then use this information to create radio channel settings to ensure that the leader compass device and follower compass devices are all on the same channel (i.e. part of the same group).

As noted above, in one embodiment, a color is assigned to each compass device in the group. In one embodiment, the color assigned to each compass device is based on the device's ID number. The compass devices are ranked in a sorted list in order from smallest ID to largest ID and then that sorted list is applied to a predefined set of colors for a given group size. This process ensures that all compass devices get a different color and that all compass devices are aware of each other's color at the end of pairing. In one embodiment, the pairing process is indicated to the user using colored LEDs on the digital compass device. When compass devices are discovered but not linked via channel settings, a particular color of LED (such as white or other neutral color) may be shown to represent each discovered but not linked compass device. When the compass devices are linked on the same channel, the LEDs may then turn from white to the color assigned to the compass device represented by that particular LED. Additional details related to the LEDs utilized by the digital compass devices will be discussed below.

In various embodiments, each group of users has their locations, messages, and other data encrypted and not viewable by devices of others outside of their group. As discussed above, in one embodiment, this is done via a pre-shared encryption key. This key is either generated and shared during the pairing process, as outlined above, or shared via a link on an application associated with the digital compass device. In various embodiments, a user can join or leave a group via either the digital compass device itself or via an application associated with the digital compass device. Additional details related to an application associated with the digital compass device will be discussed below.

Returning now to FIG. 5A, in one embodiment, at operation 524, for each of the paired digital compass devices, positional data is obtained representing the digital compass device's own geographic location.

Referring to FIG. 2, FIG. 3A, and FIG. 5A together, in one embodiment, digital compass device firmware 204 includes position finding module 205, which provides various methods for determining the positions/locations of paired digital compass devices 202a, 202b, 202c through 202n relative to the position/location of digital compass device 201. Throughout the present disclosure, the terms "position," "positional data," "location," and "location data," may be used interchangeably to refer to the position/location of a particular user relative to a current user. In some instances, the terms may refer to an absolute position, such as coordinates of a geographical location. The meaning of these terms throughout the present disclosure should be clear to those of skill in the art from the context in which these terms are used.

As shown in FIG. 3A, in one embodiment, custom PCB 301 includes an onboard GPS assembly which allows each compass device to retrieve its own physical point in space (i.e. location/coordinates). In one embodiment the GPS assembly includes GPS chip 305, GPS antenna connection point 307, GPS antenna (not shown), and GPS backup battery 311. In one embodiment, custom PCB 301 includes a circuit of GPS chip 305, GPS antenna (not shown), and microcontroller 303.

The functioning of GPS chip 305, GPS antenna connection point 307, and GPS antenna (not shown) are well known to those of skill in the art. In one embodiment, to enhance the GPS signal reception, custom PCB 301 further includes GPS antenna cutout 309. GPS antenna cutout 309 allows the GPS antenna (not shown) to be positioned within the cutout, such that the GPS antenna (not shown) faces upward towards the sky, when digital compass device 201 is held level with the ground. This design prevents the surface material of custom PCB 301 from interfering with the GPS signal.

In one embodiment, the GPS assembly of custom PCB 301 further includes GPS backup battery 311, which increases the speed at which the GPS is able to lock onto satellites. In one embodiment, while the digital compass device 201 is turned off, and the main battery is disconnected from power, GPS backup battery 311 slowly trickles charge into the GPS to keep the GPS clock awake. This ensures that when digital compass device 201 is turned back on, the device can lock onto the GPS satellites much faster than it would if GPS backup battery 311 was not present.

Returning back to FIG. 5A, in one embodiment, once each digital compass device has obtained its own positional data at operation 524, process flow proceeds to operation 526. In one embodiment, at operation 526, each of the paired digital compass devices transmits its own positional data and/or any message data to one or more of the other digital compass devices in the mesh network.

Referring to 2, FIG. 3A and FIG. 5A together, in one embodiment in one embodiment, digital compass device firmware 204 includes communications module 206, which handles transmission and receival of compass device positional data and/or message data between paired digital compass devices.

In one embodiment, the device positional data is communicated out at a set interval, and/or if the position of any one of the compass devices changes significantly (whichever of these events occurs first). In one embodiment, the set interval may be 5 minutes, in one embodiment it may be 15 minutes, in other embodiments it can be any interval of time as determined to be most effective for the intended purpose. In one embodiment, when one compass device in the mesh network receives a message, it rebroadcasts the message back out to the mesh. In one embodiment, the number of rebroadcasts of a message is configurable. In one embodiment, each message is rebroadcast 3 times. In one embodiment, if a compass device sees a message that it has already rebroadcast, the compass device does not rebroadcast the message.

In one embodiment, communications module 206 is configured to monitor channel utilization to determine how busy the particular channel being utilized by the compass device is, as well as to monitor how much data is being sent. This allows the digital compass devices to limit the message data being sent if the utilization of that channel is too high or if that particular device has been using the channel too frequently. In one embodiment, if a determination is made that the channel utilization is too high, communications module 206 may delay one or more messages from being sent until the utilization of that channel has decreased, which ensures that messages can still be sent when the channel is busy.

In one embodiment, communications module 206 of each of the compass devices communicates their device's own latitude and longitude coordinates, as well as any message data, to the other paired compass devices in the group over the mesh network via a radio assembly of custom PCB 301, which in one embodiment includes LoRa radio 313, LoRa antenna connection point 315, and LoRa antenna (not shown). In one embodiment, PCB 301 includes a circuit of LoRa radio 313, LoRa antenna (not shown), and microcontroller 303. In one embodiment, the radio assembly utilizes a 915 MHZ LoRa radio and 915 MHZ LoRa antenna. In contrast, in the United States, most off-the-shelf hardware and radios use 2.4 GHZ Bluetooth for their communication needs because it tends to be easier to work with. However, the inventors have found that a lower frequency is much better suited to the problems addressed by the present disclosure.

Of specific concern is the effects of water attenuation on the radio signal. Lower frequencies are absorbed by water exponentially less than higher, faster frequencies. Due to the fact that human bodies are largely composed of water, when trying to communicate in areas with dense crowds (such as large social gatherings and festivals), use of lower frequencies provides much greater signal range. The LoRa protocol is long range, low power, and is less sensitive to noise, which allows the signals to go further. LoRa radios can also be configured to suit specific use cases. For example, LoRa radios can be configured to transmit data at a long, slow rate, which is ideal for transmitting small amounts of data across long ranges. Higher frequencies can communicate more information faster but would limit the range of the signal.

While 915 MHZ LoRa radios have many advantages over other options for transmitting data under similar circumstances, and are discussed at length throughout the present disclosure, other frequencies and protocols may still be used by the disclosed embodiments to achieve similar results. Of particular note is the fact that different countries utilize different versions of these radio bands. For example, in the United States, 915 MHZ is a public use band, while in Australia their version of the public use band is approximately 477 MHZ. Therefore, it should be appreciated by one of skill in the art that there are many different options available for radio communication depending on a user's geographic location and intended use, and so the above discussion is not intended to limit the scope of the invention as disclosed and claimed herein.

In one embodiment, in order to achieve greater range, the digital compass device firmware implements a "redundancy layer" using an internet-connected application on a mobile device that is paired with the compass device, which may send the same positional/message data packets sent through the above-described mesh network through the internet as well as through the mesh network. This redundancy layer allows seamless communication between the digital compass devices in situations where the mobile application has connectivity, but the compass device is not able to connect to the mesh radio network. In the following discussion, the term "mobile device" may be used in place of "application" or "mobile application" in reference to actions performed by the internet-connected application on a mobile device that is paired with the compass device.

In one embodiment, a positional/message data packet contains the ID of the sending compass device, the type of data included in the packet (i.e. positional data or message data), the details of the data included in the packet, and the intended recipient(s) of the data packet. In one embodiment, the data packet also includes a unique channel identifier that identifies the channel the message was sent to on the mesh network. As discussed above, this channel identifier is determined at the time of device pairing and is unique for all compass device channels in existence and is shared by the compass devices paired on that channel.

In one embodiment, the mobile application then publishes the data packet to a server/broker in the cloud, such as, but not limited to, a Message Queuing Telemetry Transport (MQTT) server/broker. In one embodiment, data packets are published to topics, and each mobile application subscribes to and publishes to two different topics, each scoped by the unique channel identifier. One topic is for communicating the position of all compass devices the connected mobile device/compass device is aware of (via the mesh network), and the other topic is for sending alerts and text messages. In one embodiment, after the pairing process has been completed and the unique channel identifier has been determined by all devices, the compass device sends the channel identifier to the mobile device. The mobile device then subscribes to the position topic and the message topic associated with that channel identifier.

With respect to the position topic, in one embodiment, every time a compass device sends a position update to the mesh network it also takes the known positions of the compass devices it is aware of and sends them to the mobile device via Bluetooth and the mobile device will then send that position-type data packet to the MQTT server. In one embodiment, other mobile devices that have subscribed to the position topic for that channel identifier then receive the sending compass device's list of known compass devices with their last known positions and a timestamp to indicate how fresh that last known position is.

In one embodiment, for each received compass device position, the mobile device updates its own local database with the most recent positional data (latitude/longitude) of each compass device if the timestamp is more recent. In one embodiment, the mobile device then sends these updates to the compass device as well, and the compass device updates its database with the most recent positional data of each compass device position received from the MQTT position-type data packet.

With respect to the message topic, in one embodiment, every time a compass device sends an alert (or the mobile device sends a text message to the mesh network) it will also be sent to the MQTT server via the same process as described above, but it will be sent to the message topic instead of the position topic. In one embodiment, when a message-type data packet is received by other mobile devices subscribed to the message topic for that channel identifier, the applications on the mobile devices then make a decision as to whether the message should be presented to the paired compass device based on an analysis of the timing of the message sent and the timing of the message received, as well as taking into account whether the message was already seen via the mesh network.

In one embodiment, each message has a unique ID that is the same when the message is sent on the mesh network as when the message is sent over the internet via MQTT. In one embodiment, the mobile device won't send the message to the compass device if the message was already processed by the mesh network. In one embodiment, the compass device keeps a record of which message IDs have been received in order to determine if a message is a duplicate or not. If it is determined that the message was not already received via the mesh network, the mobile application makes a decision on whether to send it to the compass device based on timing. For example, in one embodiment, if the message was received greater than X seconds (where X is a configurable interval) after it was sent, then the message is not relayed to the compass device. In another embodiment, all messages are relayed to the compass device regardless of time received and sent. These messages also appear in the mobile application just as they would if they were sent via the mesh network.

In one embodiment, once each compass device's positional data and/or message data is transmitted to the other compass devices in the mesh network at operation 526, process flow proceeds to operation 528. In one embodiment, at operation 528, for each of the paired digital compass devices, the magnetic declination for the compass device's location and the magnetic heading for the compass device is determined.

Figures 5C, 5D, 5E:
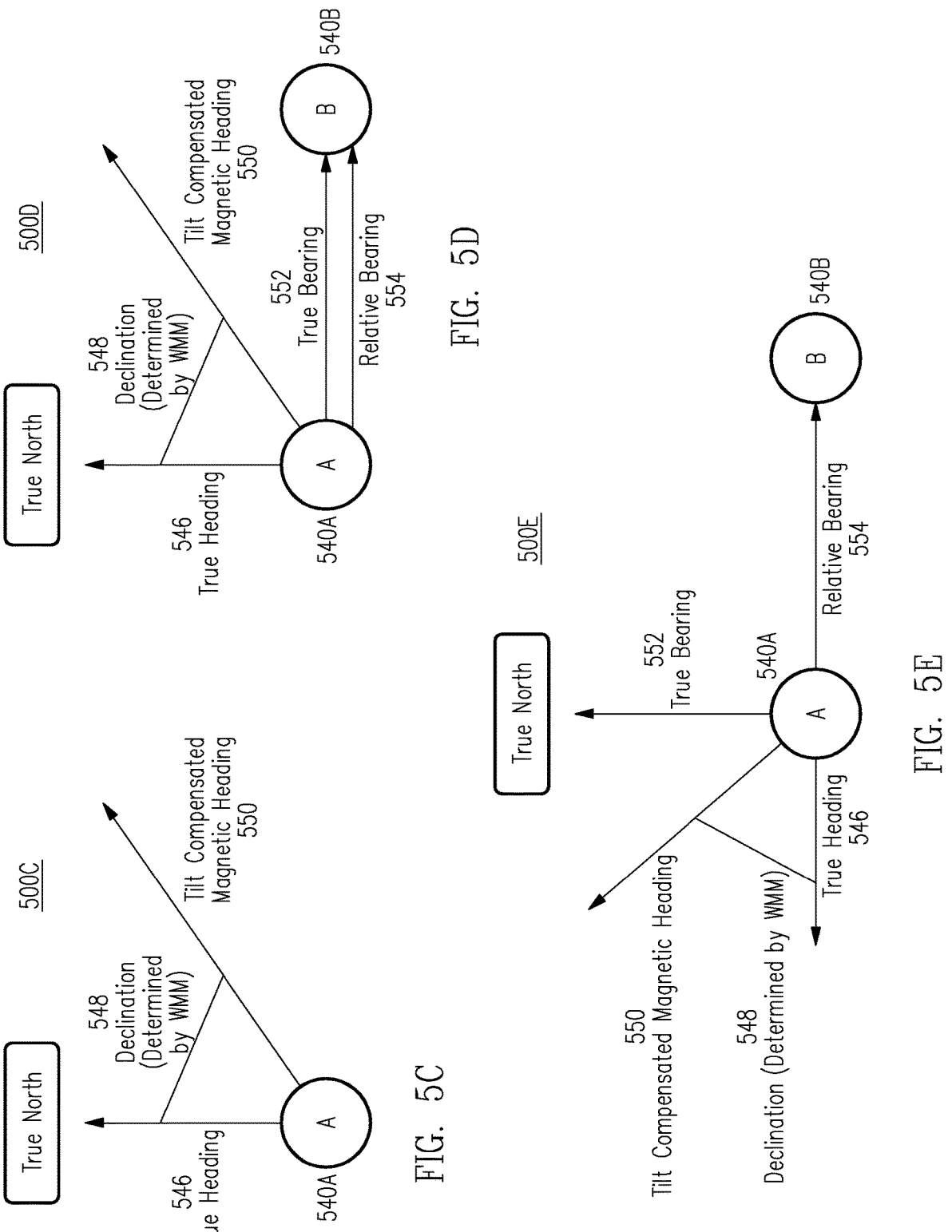
FIG. 5C is a diagram illustrating the relationship between a compass device's magnetic heading, magnetic declination, and true heading, in accordance with one embodiment.
FIG. 5D and FIG. 5E are diagrams illustrating the relationship between a compass device's magnetic heading, magnetic declination, and true heading, and further illustrating the relationship between the true bearing and relative bearing from one compass device to another compass device, in accordance with one embodiment.

FIG. 5C is a diagram 500C illustrating the relationship between a compass device's magnetic heading, magnetic declination, and true heading, in accordance with one embodiment.

As used herein, the term "magnetic declination" refers to the difference between true north and magnetic north, as calculated using the World Magnetic Model (WMM) (as will be discussed below). As used herein, the term "magnetic heading" refers to the heading in which the compass points, which is not corrected for magnetic variation (declination) and is referenced to magnetic north. As used herein, the term "true heading" refers to the actual direction in which the compass points, corrected for magnetic variation (declination) and referenced to true north, where true heading=magnetic heading+declination. As shown in FIG.

5C, true heading 546, magnetic heading 550, and magnetic declination 548, are properties of each individual compass device, such as compass device 540A, and do not involve data associated with the other compass devices in the group.

In one embodiment, the magnetic declination of a device's location is determined once the compass device turns on, and is based on latitude, longitude, altitude, and date (all provided by GPS) by using the WMM. In various other embodiments, other methods may be used to determine a device location's magnetic declination. In various embodiments, these calculations are performed by custom code created by the inventor by applying obscure rough formulas for tilt compensation to the use of magnetometers and accelerometers.

In one embodiment, in order to calculate the magnetic declination using the WMM, the current time needs to be specified in the format of a "decimal" year (e.g. 2024.35). This is because magnetic north shifts over time, and the WMM accounts for this. Thus, to get the most accurate magnetic declination, the current time first needs to be converted into the proper format. In one embodiment, the digital compass device does this by using the timestamp from the GPS signal, and utilizes the following formula for the conversion: float decimalYear=year+(month−1)/12.0+(day−1)/365.0.

In one embodiment, once the decimal year has been calculated, the WMM is utilized to calculate the declination as follows:

geomag::Vector mag_field=
geomag::GeoMag (decimalYear,position,geomag::WMM2020);
geomag::Elements out=
geomag::magField2Elements (mag_field, lat, lon);
float declination=out.declination;

Referring to FIG. 3A, FIG. 3B, FIGS. 5A, and 5C together, in various embodiments, in order to accurately calculate the true heading of a digital compass device, compensation must be made for downward tilt of Earth's magnetic field. This tilt compensation is critical since without the compensation, the slightest tilt in the compass device would create a wildly inaccurate heading. In order to calculate a tilt compensated magnetic heading, in the disclosed embodiments, two separate IC chips are utilized-magnetometer chip 333, and gyroscope and accelerometer chip 317. In one embodiment, magnetometer chip 333 reads Earth's magnetic field and outputs the X, Y, and Z strengths of the magnetic field as vectors. In one embodiment, gyroscope and accelerometer chip 317 outputs the strength of the acceleration vector towards the earth (gravity) in X, Y, and Z. In one embodiment, trigonometry is used to determine the orientation of the digital compass device by turning the acceleration vectors into roll and pitch values, where pitch is tilted forward/back, and roll is tilted side to side. In one embodiment, the pitch and roll values representing the device's orientation are used to compensate for the downward pointing of Earth's magnetic field and are combined with the X, Y, and Z vectors to create a tilt compensated magnetic heading.

In one embodiment, once the magnetic declination and the tilt compensated magnetic heading are determined at operation 528, process flow proceeds to operation 530. In one embodiment, at operation 530, for each of the paired digital compass devices, the digital compass device's true heading is calculated by applying the compass device's tilt compensated magnetic heading to the compass device's magnetic declination.

In one embodiment, each compass device calculates its own true heading multiple times per second, which allows the user to see the LEDs (representing group members) on the display of the digital compass device as the group members move and as they rotate their device or face in different directions, as will be discussed in additional detail below. This makes the digital compass device similar to an actual compass since the LEDs (representing group members) are fixed in absolute space regardless of the orientation of the digital compass device.

In one embodiment, once a compass device has calculated its own true heading at operation 530, process flow proceeds to operation 532. In one embodiment, at operation 532, for each of the paired digital compass devices, positional data is received from one or more of the other digital compass devices, and the positional data is used to calculate true bearing, relative bearing, and distance from a particular one of the compass devices to the one or more of the other digital compass devices.

FIG. 5D and FIG. 5E are diagrams 500D and 500E illustrating the relationship between a compass device's magnetic heading, magnetic declination, and true heading, and further illustrating the relationship between the true bearing and relative bearing from one compass device to another compass device, in accordance with one embodiment.

As used herein, the term "bearing" refers to a relative concept between two compass devices and is the direction a user of one compass device would have to walk in, relative to their current orientation, in order to get to the other compass device. As used herein the term "true bearing" refers to the direction a user of one compass device would have to walk in when the compass is oriented to true north. As used herein, the term "relative bearing" refers to the direction a user of one compass device would have to walk in based on the actual orientation of their compass device, where relative bearing=true heading-true bearing.

As shown in FIG. 5D and FIG. 5E, true bearing 552 and relative bearing 554 describe the direction a user of compass device 540A would need to walk in to reach the user of compass device 540B, depending on the user of compass device 540A's orientation. For example, in FIG. 5D, the user of compass device 540A has the device pointing directly north, and so in this example, relative bearing 554 is the same as true bearing 552, 90 degrees to the right of the user's orientation. In contrast, as shown in FIG. 5E, the user of compass device 540A has the device pointing to the west, and so the relative bearing 554 is no longer the same as the true bearing and is instead 180 degrees relative to the user's orientation.

Referring again to FIG. 2 and FIG. 5A together, in one embodiment, in addition to calculating a compass device's true bearing and relative bearing to other compass devices, position finding module 205 also receives positional data (i.e. latitude/longitude) from other compass devices in the mesh network, and calculates distance between a particular user/device and other users/devices by determining distance between the latitudinal/longitudinal coordinates of the user and the latitudinal/longitudinal coordinates of the other group members. In one embodiment, the above-described calculations are performed using the Haversine Formula, which is implemented by custom firmware developed by the inventor.

Returning now to FIG. 5A, in one embodiment, once the true bearing, relative bearing, and distance to other compass devices for each of the digital compass devices is calculated at operation 532, process flow proceeds to operation 534. In one embodiment, at operation 534, for each of the paired digital compass devices, a visual representation of the relative bearing to one or more of the other digital compass devices is generated and displayed.

Referring now to FIG. 2, FIG. 3B, FIG. 4A, and FIG. 5A together, in one embodiment, digital compass device firmware 204 includes LED control module 207, which further includes position display module 209, message display module 211, light show module 213, and device info display module 215.

With respect to position display module 209 of LED control module 207, as noted above, in one embodiment, once two or more digital compass devices have been paired, communications module 206 transmits its device's positional data to the other compass devices in the mesh network. In one embodiment, upon receipt of positional data from one or more of the other compass devices and calculation of the true bearing, relative bearing, and distance to the other compass devices, the location of one or more of the other compass devices is rendered as a colored LED dot on LED compass display 405 of digital compass device 201.

In various embodiments, in order to show the LEDs smoothly rotating as the user rotates the digital compass device, the LED compass display 405 of digital compass device 201 utilizes multiple concentric rings of LEDs, such as concentric LED rings 337. In one embodiment, concentric LED rings 337 are utilized to show the users represented by the colored LEDs moving from one distance level to another as the users/devices get closer to or further apart from each other.

In various embodiments, position display module 209 of LED control module 207 requires two main components for rendering/displaying the locations of users on LED compass display 405, relative bearing and distance. In one embodiment, relative bearing and distance are calculated as described above in the discussion of position finding module 205 of digital compass device firmware 204.

Additionally, with respect to distance, in various embodiments, the digital compass device needs to be able to show users located at short range distances as well as users located at very long-range distances. In one embodiment, a solution to this problem is to have a zoom in and zoom out feature. As noted above, in one embodiment, LED compass display 405 of digital compass device 201 includes multiple concentric LED rings 337, and in order to properly render the positional information on LED compass display 405, the scale/distances associated with each LED ring at different zoom levels needs to be determined.

As noted above, in various embodiments, users need to be able to see group members that are very far away (to know who is out there and which direction to go in) as well be able to get fine grained positional information to find out precisely where a particular group member is. Additionally, festival and event grounds, as well as locations for engaging in outdoor activities, often vary widely in size. For example, a festival such as Burning Man is roughly 3 square miles, while other types of events/festivals may cover an area of just a few hundred yards. Since there are various distance needs and users need more information from closer points than father points, in one embodiment, the digital compass devices utilize an exponential scale with varying zoom levels. In one embodiment, when a user zooms in or out on the digital compass device 201, the distances associated with each ring shift.

In one embodiment, zoom in button 329 and zoom out button 331 allow the user to select between different zoom levels. In one embodiment, for each zoom level, a specific distance is assigned to each ring of concentric LED rings 337 utilized by LED compass display 405, wherein the specific distance represents the distance between the user (located at the center of LED compass display 405) and any other paired devices in the mesh network. In one embodiment, on a given zoom level, the ring on which the LED representing a group member is to be rendered is determined by finding the ring with the smallest difference between the distance of the group member and the distance associated with the ring, where the distance to the group member does not exceed the distance associated with the ring.

In one embodiment, once the ring on which to render a group member is determined, the radial (i.e. which LED on the determined ring) to illuminate needs to be determined. In various embodiments, each ring has a different number of LEDs, since the outer rings are larger than the inner rings. In one embodiment, the number of degrees per LED is determined by dividing 360 by the number of LEDs in the ring, and then the index of the LED is determined by dividing the relative bearing in degrees by the number of degrees per LED in that ring. In one embodiment, the color of each LED is stored as an integer that is communicated across the mesh network along with position updates. In one embodiment, this integer is then converted to an RGB value using a simple algorithm.

In one embodiment, when the user changes zoom level (e.g. via zoom out button 329 and zoom in button 331), the outer ring of concentric LED rings 337 lights up, and the distance that corresponds with that ring, for the new zoom level, is displayed on LED matrix display 409, which tells the user exactly how far the outer ring is from the user's current location. In various embodiments, the ring distances of each zoom level are evenly spaced so that the user knows that the ring in the middle between the highlighted outer ring and the center of the compass device (where the digital compass device user is) is exactly half the distance to the highlighted outer ring.

As noted above, one technical problem solved by the disclosed embodiments relates to providing the ability to more easily find group members at very close distances in addition to those at further distances. In general, GPS has an accuracy of a few meters, and so if two users with paired digital compass devices are trying to locate each other in a dense crowd, the GPS variance needs to be taken into consideration. For example, while on a particular zoom level, the digital compass devices may indicate that the two users/devices are right next to each other, in actuality the two users/devices may be as far as 20 feet from each other, which, especially in a dense crowd, is likely not close enough to be able to easily locate the other user/device.

In one embodiment, in order to solve this technical problem, the digital compass device gives the user the ability to switch the device into "Hot/Cold" mode, which essentially lets the user "home in" on someone who is close by. In one embodiment, this is done by measuring the received signal strength indicator (RSSI) of nearby digital compass device Bluetooth beacons.

In one embodiment, the digital compass devices know to automatically start broadcasting a hot/cold packet/beacon over Bluetooth when they know that another paired compass device is within 50 feet. A compass device knows if another paired device is within 50 feet based on the "typical" compass operation (i.e. the other compass has communicated its GPS location via the LoRa mesh network and the receiving compass device has determined it is within 50 feet). In one embodiment, once this happens, the compass devices start broadcasting a Bluetooth beacon dedicated to "Hot/Cold" mode that includes the compass ID (node number) as well as the color assigned to the compass device. These packets may be broadcast once a second until there are no longer any nearby compass devices.

In another embodiment, a compass device knows to start broadcasting hot/cold packets if it receives a hot/cold packet from another compass device. In this embodiment, the compass device will also start broadcasting hot/cold packets when the user enters "Hot/Cold" mode. As discussed above, in various embodiments, the digital compass devices have a zoom function. In one embodiment, a user enters "Hot/Cold" mode by zooming in to the most zoomed in level. The digital compass device then changes from its standard compass mode (where nearby users are shown as LED dots), and instead shows nearby users as LED bars on the LED matrix 339. In one embodiment, each bar flashes faster/slower depending on if the user is getting closer to or further from the compass device associated with that LED bar.

In one embodiment, the hot/cold packet is received by the listening compass device and stored in its memory. When the listening compass device receives this packet from the sender of the hot/cold packet, it then records the signal strength of the packet (RSSI). When a compass is in "Hot/Cold" mode it determines if a user/device is getting closer or farther based on change in RSSI for the compass device it is homing in on. For example, the first hot/cold packet a compass device receives may have an RSSI of −70. Then if the user walks in a direction closer to the sending device, the RSSI may update to −60. The compass device then knows the user has gotten closer to the sending compass device and can update the compass device's visual display accordingly. Similarly, if the RSSI value instead goes to −80 then the compass device knows the user is getting father from the sending device.

In one embodiment, the compass devices are also preprogrammed with a static RSSI value that represents "very close by" as well as 10 feet, and 50 feet, by placing compasses at known distances and recording the RSSI. This preprogramming may be used to give the "Hot/Cold" mode a baseline so it knows how fast to start flashing initially depending on where in the scale the compass device falls. It should be noted again that the above example is given for illustrative purposes only and is not intended to limit the scope of the invention as disclosed and claimed herein.

In one embodiment, instead of providing a "Hot/Cold" mode, the digital compass devices utilize Ultra-wideband (UWB) technology, which allows for <1 cm locating precision and would increase accuracy of the digital compass devices at short distances (e.g., less than 20 feet). In various other embodiments, other methods and/or radio technologies could be utilized to increase accuracy of the digital compass devices as known by those of skill in the art, and as may be developed after the time of filing.

In one embodiment, once the visual representation of the positional data of one or more of the other compass devices is displayed to the user at operation 532, process flow proceeds to operation 534. In one embodiment, at operation 534, for each of the paired digital compass devices, any messages received from each of the other digital compass devices are displayed to the user.

Referring now to FIG. 2, FIG. 3B, and FIG. 4A together, in addition to the positional data display functionality, in one embodiment, digital compass device 201 also has the ability to send, receive, and display messages, notifications, alerts, and/or animations. In one embodiment, this functionality is handled by message display module 211 of LED control module 207, which receives message data from communications module 206. In one embodiment, in order to communicate more information to the user and to allow for display of messages, notifications, alerts, and/or animations on digital compass device 201, in addition to the LED compass display 405, which utilizes concentric LED rings 337 to display the colored LEDs representing the position of each group member, digital compass device 201 also includes LED matrix display 407. In one embodiment, LED matrix display 407 utilizes LED matrix 339 of custom PCB 301.

In one embodiment, the functionality of LED matrix 339 is integrated/blended with the functionality of concentric LED rings 337 of custom PCB 301. This allows LED compass display 405 and LED matrix display 407 to work together to display smooth rotation of LEDs as the direction of digital compass device 201 rotates. This also allows LED compass display 405 and LED matrix display 407 to display smooth movement of LEDs when the LEDs representing the paired digital compass devices in the mesh network get closer together or farther apart as the user changes the zoom level.

As noted above, in various embodiments, messages, alerts, and/or animations are able to be displayed to the user on LED matrix display 407 and blending the functionality of concentric LED rings 337 with that of LED matrix 339 serves to reduce the number of LEDs required to be present on custom PCB 301. For example, as shown in FIG. 3B, in one embodiment, specific LEDs of LED matrix 339 can also serve as the inner most set of rings of concentric LED rings 337. In one embodiment, two or more of the concentric LED rings 337 and LED matrix 339 are arranged such that one or more of the LEDs in LED matrix 339 forms one or more portions of one or more of concentric LED rings 337. This design allows for compass device positional data to be displayed on LED compass display 405, while also allowing for texts, alerts, and animations to be shown on LED matrix display 407.

In one embodiment, LED matrix 339 is a 5×15 matrix, which allows for display of a smallest legible font while providing spacing between LED columns that allows LED matrix 339 to be seamlessly blended with concentric LED rings 337. In various other embodiments, LED matrices of other dimensions could be utilized to achieve similar effect.

Referring again to message display module 211 of LED control module 207, as discussed above, in various embodiments, users of the digital compass device 201 are able to send messages to and receive messages from the other members of their group (i.e. other compass devices paired in the mesh network). In one embodiment, message display module 211 utilizes LED matrix display 407 to display these messages, as well as a variety of notifications, alerts and animations. As noted above, one technical problem solved by the disclosed embodiments relates to minimizing radio bandwidth usage in message sending between the digital compass devices.

In various embodiments, each digital compass device 201 ships with a set of preconfigured messages. In one embodiment, a user can view the preprogrammed message choices on LED matrix display 407 and select a message to send. In one embodiment, a user presses action button 335 of digital compass device 201 once to view a message choice and is able see the message scroll across LED matrix display 407. In one embodiment, while the message is scrolling, the user can either press the action button 335 again to view the next message choice or long press action button 335 to send the selected message. In one embodiment, when the selected message sends, text, such as "alert sent" may be displayed to the sending user on LED matrix display 407. In one embodiment, each preconfigured message is associated with an integer value, and only the integer value is attached to the radio packet in order to minimize the packet size. In one embodiment, when a message is received by the other compass devices in the group, the text corresponding to the integer is looked up and displayed on the LED matrix display 407 of the receiving devices as scrolling text in the sending device's assigned color. In one embodiment, the LEDS of the receiving devices also flash in the color assigned to the sender's device, in addition to scrolling the message text. In one embodiment, the text continues to scroll on the receiving user's device until the receiving user presses action button 335 on digital compass device 201 to dismiss the alert.

It should be noted that the above example of message sending functionality is given for illustrative purposes only and is not intended to limit the scope of the invention as disclosed and claimed herein. For example, in some embodiments, custom messages are able to be sent in addition to or instead of preconfigured messages. Further, in some embodiments, a wide variety of alternative mechanisms may be used to display and/or dismiss messages, as is known by those of skill in the art.

In one embodiment, once any received messages are displayed to the user at operation 534, each digital compass device continually checks for and displays updates on the users' positional data and message activity until the device is powered down, at which point process flow proceeds to END operation 536.

In addition to the core features described in the above discussion of FIG. 5A and FIG. 5B, in various embodiments, any number of additional features may also be available to the user.

For example, referring now to FIG. 2 and FIG. 4A together, as noted above, in some embodiments, digital compass device firmware 204 also provides a "party mode" option which essentially displays a light show on the face of the device using LED compass display 405 and/or LED matrix display 407. This allows users to enjoy using digital compass device 201 even when they're not otherwise using the device to find or message their group members. In one embodiment, party mode is handled by light show module 213 of LED control module 207. In one embodiment, entering party mode causes the LEDs of the digital compass device 201 to light up and flash in different patterns and colors on the face of the device. In one embodiment, the user can choose from a variety of LED colors and flashing patterns when in party mode. In some embodiments, digital compass device 201 includes a forward-facing LED (not shown) which enables digital compass device 201 to be used as a flashlight.

In one embodiment, the digital compass devices can be put into "party mode" via shaking the device and/or pressing a combination of device buttons. In various embodiments, party mode has multiple special effects and allows the user to change both color and special effects by pressing specific device buttons. In one embodiment, one of the available special effects includes a synchronized light display between devices, which utilizes the GPS clock to keep each device synchronized, enabling the devices to all flash together at the same time. In one embodiment, when a compass device receives a GPS signal, it records the timestamp that comes with the GPS signal in its memory. It then starts counting the milliseconds from that point in time. Each compass can establish an absolute real time clock, that is synced with other compasses, by adding their millisecond count at any given time to the last recorded GPS timestamp they received. In various embodiments, the compasses use these synchronized real time clocks to display special effects, flash, and work together in coordinated unison to display coordinated light shows.

In some embodiments, the above-described clock is also used in "Hot/Cold" mode as a supplementary way of measuring distance. Since speed of light is a known constant, and all compass devices have the same synchronized clock, then distance between compasses is simply calculated as: distance=speed of light/time. In one embodiment, time is calculated as difference between send time and receive time, where send time is recorded on the packet being sent by the sending compass device.

In one embodiment, the digital compass device includes a microphone, which "listens" to the surrounding audio (e.g. music), and creates a sound reactive light show/visualizer depending on the frequencies of the audio. In one embodiment, a Fast Fourier Transform is used to break down the microphone input into different frequency bands (bass, mid, treble, etc.) and what proportion of each band the current audio contains. In various embodiments, the light show/visualizer might have different visuals depending on the microphone input. For example, bass notes might be represented by red LEDs and mid notes might be represented by blue LEDs. In one embodiment, the visualizer may resemble a bar graph. In some embodiments, the microphone can be used to record audio such as voice and music. In one embodiment, the digital compass device also includes a speaker which is capable of playing music and/or sound effects, as well as providing audio alerts and notifications.

Returning now to FIG. 2 and FIG. 3A together, in one embodiment, digital compass device firmware 204 includes power management module 219, and custom PCB 301 includes power regulator IC 324, which is utilized by power management module 219 for power regulation. In various embodiments, custom PCB 301 includes power regulation circuits, such as power regulator IC 324, and battery contacts for the battery power. In one embodiment, digital compass device 201 utilizes constant 3.3 v voltage and uses 3xAA batteries with a wide voltage range, and custom PCB 301 includes a circuit for measuring voltage of batteries and thus determining battery life. In some embodiments, digital compass device 201 utilizes rechargeable batteries instead of AA batteries. As noted above, in one embodiment, custom PCB 301 includes multiple circuits of individually addressable LEDs used by the compass device displays. In one embodiment, each LED circuit includes a transistor and is connected to its own power net, while in other embodiments custom PCB 301 includes only one circuit of LEDs with no transistor. In one embodiment, each LED draws current, even when off. In one embodiment, microcontroller 303 can turn off a section of LEDs using the transistor and thus save power.

Referring to FIG. 2, FIG. 3A, and FIG. 4A together, in one embodiment, LED control module 207 of digital compass device firmware 204 includes device info display module 215, which handles display of device information when the device is switched into information mode. In one embodiment, information mode can be entered by simultaneously pressing both zoom in button 329 and zoom out button 331 of digital compass device 201. In one embodiment, in information mode, battery life is displayed as a battery icon/animation on LED matrix display 407. In order to display battery life, in one embodiment, the voltage of the batteries is measured using an ADC (analog to digital converter) of microcontroller 303 and a voltage divider using resistors. The voltage divider is used to drop the battery voltage down to a safe voltage for microcontroller 303. The voltage drop may be necessary because the maximum input of the ADC on some microcontrollers is 3.3 v, however some batteries used by digital compass device 201 can have 4.5V fully charged. In one embodiment, the voltage is then read and scaled as a float value from 0.0 to 1.0, which represents the percentage of battery life left. In one embodiment, this percentage value is then used in rendering a battery icon on the LED matrix display 407, which in one embodiment, looks like battery icon on a typical mobile phone. In one embodiment, there are 10 "internal columns" of the battery icon that represent its charge percentage. If the battery is fully charged (1.0) then all 10 bars are displayed. If the battery is <=10% charged, then only 1 column is displayed. In one embodiment, the columns are colored in a gradient from red to green so the "low charge columns" are red and the "full charge" columns are green.

Referring now to FIG. 2, FIG. 3B, and FIG. 4A together, with respect to calibration module 217 of digital compass device firmware 204, in various embodiments, digital compass device 201 includes one or more magnetometer IC chips, such as magnetometer chip 333, which need to be calibrated periodically to ensure good performance. In one embodiment, the device can be put into calibration mode by pressing a certain combination of buttons. In one embodiment, upon being put into calibration mode, digital compass device 201 relays a "calibrating" message to the user via LED matrix display 407, which instructs the user to move the device around for a set period of time (e.g. 30 seconds) to complete the calibration procedure. In one embodiment, during calibration, LEDs on digital compass device 201 light up to indicate duration remaining of calibration procedure. In one embodiment, while the user is moving their device around in calibration mode, the device is reading magnetometer chip 333 and recording the values. In one embodiment, digital compass device 201 stores the maximum and minimum values for all 3 dimensions of the magnetometer data (i.e. X, Y, Z). This data is then saved and used by the magnetometer library as simple calibration. In one embodiment, the calibration algorithm that determines the maximum/minimum values for magnetometer data is custom code written by the inventor. In one embodiment, the calculated values are used by an existing magnetometer library as part of the calibration process.

In the above disclosed embodiments and variations, it was necessary for all of the code to be written in such a way that each functional component (networking, display, buttons, etc.) runs in its own thread. In one embodiment, each thread "ticks" forward at a certain cadence and checks a global, shared memory to see what its next actions are. A thread can either yield or do work. When the thread does work, it does only one unit of work (so as not to block the CPU) and then yields. This allows other threads to also do their one unit of work. For example, for displaying scrolling text, there are hundreds of different "frames" that scroll across and the animation can take around 20 seconds. In one embodiment, the display thread renders one frame in one tick and then yields, letting the button thread, networking thread, etc. do their one unit of work. The threads work essentially in a round-robin style algorithm where they each get a turn to do work. If the display animation were to just run in a loop until it was finished, nothing else would happen until animation was finished (button presses would not register, networking would not happen, etc).

Returning now to FIG. 2, in some embodiments, digital compass device 201 is able to be optionally paired with an application associated with the digital compass device, such as, but not limited to, digital compass application 225 provided on user mobile device 223. In some embodiments, digital compass application 225 may provide a variety of additional features to the user, such as, but not limited to, enhanced message sending, public and emergency broadcast channels, device lighting effects customizations, advanced group management capabilities, social media platform and community engagement features, integrated event-specific features, and remote firmware updates.

In one embodiment, additional features provided by digital compass application 225 may include enhanced message sending, such as allowing additional (non-preset) messages to be sent to group members through digital compass application 225 and received by the group members via their respective digital compass devices. For example, if a user needs to send a specific message to members of their group (e.g. "car is parked at section 2B"), they can do so through digital compass application 225 without needing cell service or an internet connection. In one embodiment, users can also choose if they want to send messages to a single person in the group or to the entire group.

In one embodiment, additional features provided by digital compass application 225 may include device lighting effects customizations, such as, but not limited to, allowing for customization of LED colors on the digital compass device 201. For example, in one embodiment, using digital compass application 225, users can change the color that represents them on the digital compass device 201. In one embodiment, users can also provide identifying information to more readily associate a group member with the group member's assigned color (e.g. Chris is Blue, Colton is Red, etc.)

In one embodiment, additional features provided by digital compass application 225 may include advanced group management capabilities, such as, but not limited to, allowing users to create, name, manage, join, and leave groups. In some embodiments, without the application, each device can only be paired with one group of users, whereas with the application, it becomes possible for users to belong to multiple groups. For example, some users may want to be in a first group with friends they came to the event with and in a second group with people they met at the event.

In one embodiment, additional features provided by digital compass application 225 may include features related to social media platforms and community engagement. In one embodiment, by downloading digital compass application 225, users are able to join a community of other users who are already using the application. In one embodiment, users can interact with, message, and connect with people who are on the application and/or people who are going to the same event. For example, if a user is attending an event alone, they can use the application to create connections with other event attendees before they attend the event so that they can locate people to meet up with at the event.

In various embodiments, digital compass device 201 and/or digital compass application 225 can also integrate with event systems and infrastructure to further enhance the experience of event attendees and event staff. In some embodiments, one or more of these features are able to be provided without the user needing an internet connection.

In one embodiment, additional event integration features include providing a public channel for users to optionally communicate with others outside of their paired group and for digital compass devices to receive broadcast announcements and event specific information.

In various embodiments, in addition to the channel and encryption key that is set up for each group of compass devices at the time of pairing (as discussed above), each compass device may come with a preconfigured "public" channel, which is available to all compass devices. In one embodiment, each compass device has the same encryption key for this public channel, which prevents non-compass devices from being able to communicate with the compass devices on this channel. In one embodiment, the compass devices are always listening to this public channel. In one embodiment, compass device users can send messages to other compass devices on this public channel via an application such as digital compass application 225, as well as communicate in a "forum style" with all compass devices within range on the public channel. In one embodiment, this public channel also allows individuals such as, but not limited to, event organizers, to broadcast special announcements that can be displayed to users on the LED matrix of the digital compass devices and/or displayed to users via digital compass application 225.

In one embodiment, each digital compass device comes configured with a special public emergency broadcast channel. In one embodiment, when a user sends an emergency message via the digital compass device, it is broadcast on a public emergency channel. In various embodiments, no encryption key is utilized for the public emergency channel, and any compass device that has opted-in to see emergency alerts is able to view the location of the emergency. In one embodiment, the digital compass device also transmits a user's emergency message on the encrypted group channel that the user is a part of.

In one embodiment, additional features provided by the digital compass device 201 and/or digital compass application 225 may include providing the ability to augment radio systems used by medical and security staff, allowing staff members to send messages to each other, and to pinpoint locations of fellow staff members, current emergencies, etc. This feature could be particularly critical in helping staff locate each other in the case of medical or other safety-related emergencies.

In one embodiment, additional features provided by the digital compass device 201 and/or digital compass application 225 may include providing event-specific maps. For example, in one embodiment, digital compass application 225 may provide more detailed/accurate information related to where everyone in a user's group is, incorporating information that is specific to that event (e.g. water stations, bathrooms, stages, vendors, and other points of interest). In various embodiments, digital compass application 225 allows for an interactive map experience, allowing users to drop waypoints to the event map through the application interface. For example, a group can determine that a meet up point should be by a particular stage and they can "drop a pin" to mark that point on their map in the application.

In one embodiment, additional features provided by the digital compass device 201 and/or digital compass application 225 may include providing new attendees with virtual tours of the event grounds to familiarize the user with the important locations throughout the festival.

In one embodiment, additional features provided by the digital compass device 201 and/or digital compass application 225 may include providing an integrated network for the event, to provide users with key event information and resources, including, but not limited to, run setlists, time schedules, message boards, lost and found services, and meetup facilitation. For example, in one embodiment, by integrating the application, the digital compass device 201 is able to display reminders to the user, such as, but not limited to, when a desired artist is about to perform.

In one embodiment, additional features provided by the digital compass device 201 and/or digital compass application 225 include providing users with a means to participate in official event activities, such as, but not limited to, scavenger hunts, or other types of event-related social networking activities.

In some embodiments, the public channel of the digital compass device 201 and/or digital compass application 225 allows event organizers to create and distribute ad-hoc events and games to each compass device. For example, an event organizer can send out a radio packet with a set of latitude/longitude waypoints and a description such as, "Scavenger hunt starting in 10 minutes!" Each compass device can then record the coordinates of those waypoints in its memory and activate the first waypoint when the allotted time period (e.g. 10 minutes) has expired. In one embodiment, the compass device could then display the first waypoint as a white/colored flashing LED on the compass (or any other pre-set color not already associated with another device user). In one embodiment, when the user arrives at that first waypoint, the next waypoint will appear, and so on until the user arrives at the end (where they may win, for example, some type of prize).

In one embodiment, additional features provided by the digital compass device 201 and/or digital compass application 225 may include providing individuals and/or groups of individuals, such as but not limited to, event coordinators, performing artists, and stagehands, the ability to control the lights on the digital compass devices for large numbers of device users, for instance to provide a distributed light show that can be controlled and synced with music and other special effects.

In one embodiment, additional features provided by the digital compass device 201 and/or digital compass application 225 may include incorporation of an NFC chip or RFID capabilities to allow the digital compass device to be used as a payment source or an event entry identification method. For example, in one embodiment the digital compass device can be pre-loaded with credit and the device can be tapped at a variety of vendors to simplify making purchases. In one embodiment, event coordinators could set up certain restricted access areas, which an attendee can enter by tapping their device to confirm a user's access level.

In one embodiment, additional features provided by the digital compass device 201 and/or digital compass application 225 may include providing event staff with anonymous data tracking capabilities. For example, various people associated with coordinating the event may wish to have access to data such as, but not limited to, crowd movements, popularity of sets/stages, and/or vendor traffic.

Referring now to FIG. 2 and FIG. 3A together, in one embodiment, additional features provided by the digital compass device 201 and/or digital compass application 225 may include remote firmware update capabilities, which allow users to wirelessly update their device firmware when connected to the internet and paired with the user mobile device 223 and/or digital compass application 225. In one embodiment, custom PCB 301 includes USB to UART conversion chip 319 and USB port 321 for flashing firmware. In one embodiment, firmware update module 221 of digital compass device 201 coordinates with digital compass application 225 of user mobile device 223 to perform the firmware updates.

In one embodiment, over-the-air (OTA) firmware updates are provided to users via a Bluetooth connected mobile application, such as digital compass application 225. In various embodiments, microcontroller 303 on custom PCB 301 of digital compass device 201 has its flash drive partitioned so that there are three firmware partitions: original, OTA1, and OTA2, which may all be roughly the same size. In one embodiment, OTA partitions are partitions dedicated to firmware updates that are downloaded "over the air" from digital compass application 225. In one embodiment, an "update firmware" option is selected via digital compass application 225, and updated firmware is fetched from a dedicated firmware server (e.g. in the cloud/over the internet). In one embodiment, the most recent updated firmware is downloaded to digital compass application 225. The firmware is then sent to the digital compass device 201 via Bluetooth and stored in the second (OTA1) partition of the memory. This lets the digital compass device 201 keep functioning by using the firmware stored in the original partition while it downloads new firmware into its special OTA1 partition.

In one embodiment, after successfully writing the firmware to the OTA1 partition, the digital compass device 201 sets a flag in its flash memory to use the OTA1 partition upon boot. The digital compass device 201 then restarts, and upon boot, checks the flag to determine which partition it should use for firmware. Upon seeing that the device should use the OTA1 partition, the digital compass device 201 then boots using the newly downloaded firmware. In one embodiment, if another update takes place, the OTA2 partition is used. If a third update takes place, the OTA1 is overwritten and so on.

While the above-described embodiments of the digital compass device utilize a combination of an LED compass display and an LED matrix display to display the locations of group members and to display messages, alerts, notifications, and animations, other potential embodiments are also contemplated by the present disclosure. For example, in one embodiment, the digital compass device does not utilize an LED matrix display, and so only positional information is provided to the user via the LED compass display. In one embodiment, a screen is utilized in place of the LED matrix display. In one embodiment, the digital compass device has a single ring of LEDs on the face of the device, instead of multiple concentric rings, so less distance information is provided. In one embodiment, a central icon on the face of the device also functions as a button for sending alerts.

Figures 6A, 6B, 6C:
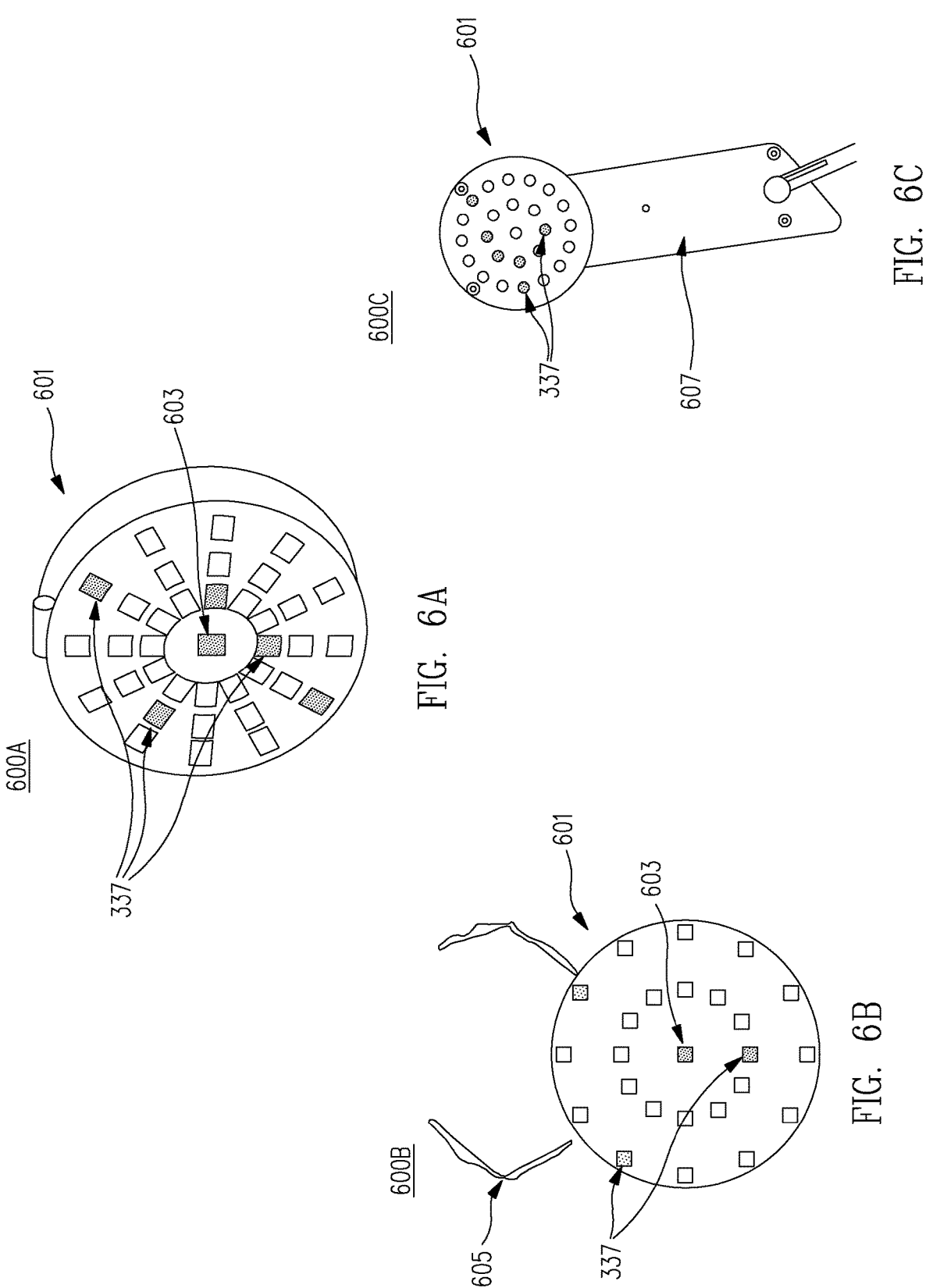
FIG. 6A through FIG. 6C are illustrative examples of alternate embodiments of a digital compass device, which do not utilize an LED matrix or a screen, in accordance with various embodiments.

FIG. 6A through FIG. 6C are illustrative examples 600A through 600C of alternate embodiments of a digital compass device, which do not utilize an LED matrix or a screen, in accordance with various embodiments.

FIG. 6A is an illustrative example 600A of a "no screen" digital compass device 601, which utilizes three layers of concentric LED rings 337 to provide a tracking mode, in accordance with one embodiment.

FIG. 6B is an illustrative example 600B of a "no screen" digital compass device 601, which utilizes two layers of concentric LED rings 337 to provide a tracking mode, in accordance with one embodiment.

FIG. 6C is an illustrative example 600C of a "no screen" digital compass device 601, which utilizes two layers of concentric LED rings 337 to provide a tracking mode, and also features a handle portion, in accordance with one embodiment.

In the illustrative examples of FIG. 6A, FIG. 6B, and FIG. 6C, center LED 603 represents the position of the user, and the illuminated LEDs of concentric LED rings 337 represent the other paired compass devices, where each compass device is represented by a different color. Distance is indicated by which ring of concentric LED rings 337 the LED is positioned on, with the inner rings being closer to the user and the outer rings being further from the user. In one embodiment, "no screen" digital compass device 601 optionally utilizes Bluetooth phone pairing with a mobile application to allow messages to be sent between group members, and also to provide group management and other customization options and features. In one embodiment, "no screen" digital compass device 601 also provides a light show mode, which can utilize concentric LED rings 337 to display lighting effects when the device is not in use as a tracker. In various embodiments, one or more accessories can be utilized with "no screen" digital compass device 601 to secure the device. For example, as shown in FIG. 6B, lanyard 605 can be used to hang the device around the user's neck. Alternatively, as shown in FIG. 6C, "no screen" digital compass device 601 may include a handle portion 607 to make use of the device more comfortable for the user.

Figures 7A, 7B, 7C:
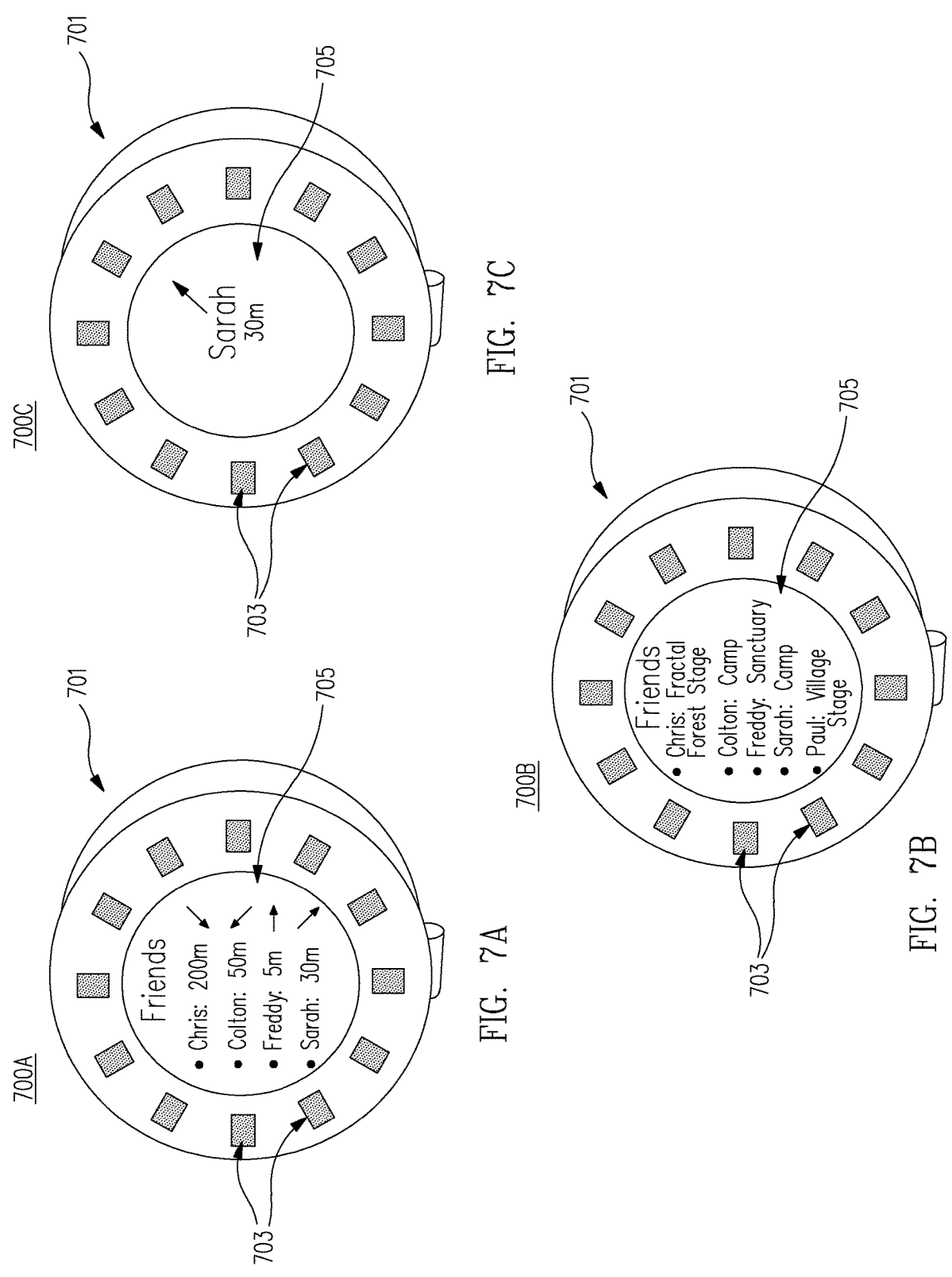
FIG. 7A through FIG. 7C are illustrative examples of alternate embodiments of a screened digital compass device, in accordance with one embodiment.

FIG. 7A through 7C are illustrative examples 700A through 700C of alternate embodiments of a digital compass device, which utilize a single ring of LEDs 703 and a display screen 705 to provide tracking and messaging data, in accordance with one embodiment.

FIG. 7A is an illustrative example of display screen 705 providing a list of other paired user devices with their distance and direction indicated. FIG. 7B is an illustrative example of display screen 705 providing a list of other paired user devices with their landmark location indicated. FIG. 7C is an illustrative example of display screen 705 providing the distance and direction of a specific paired user.

Figures 7D, 7E:
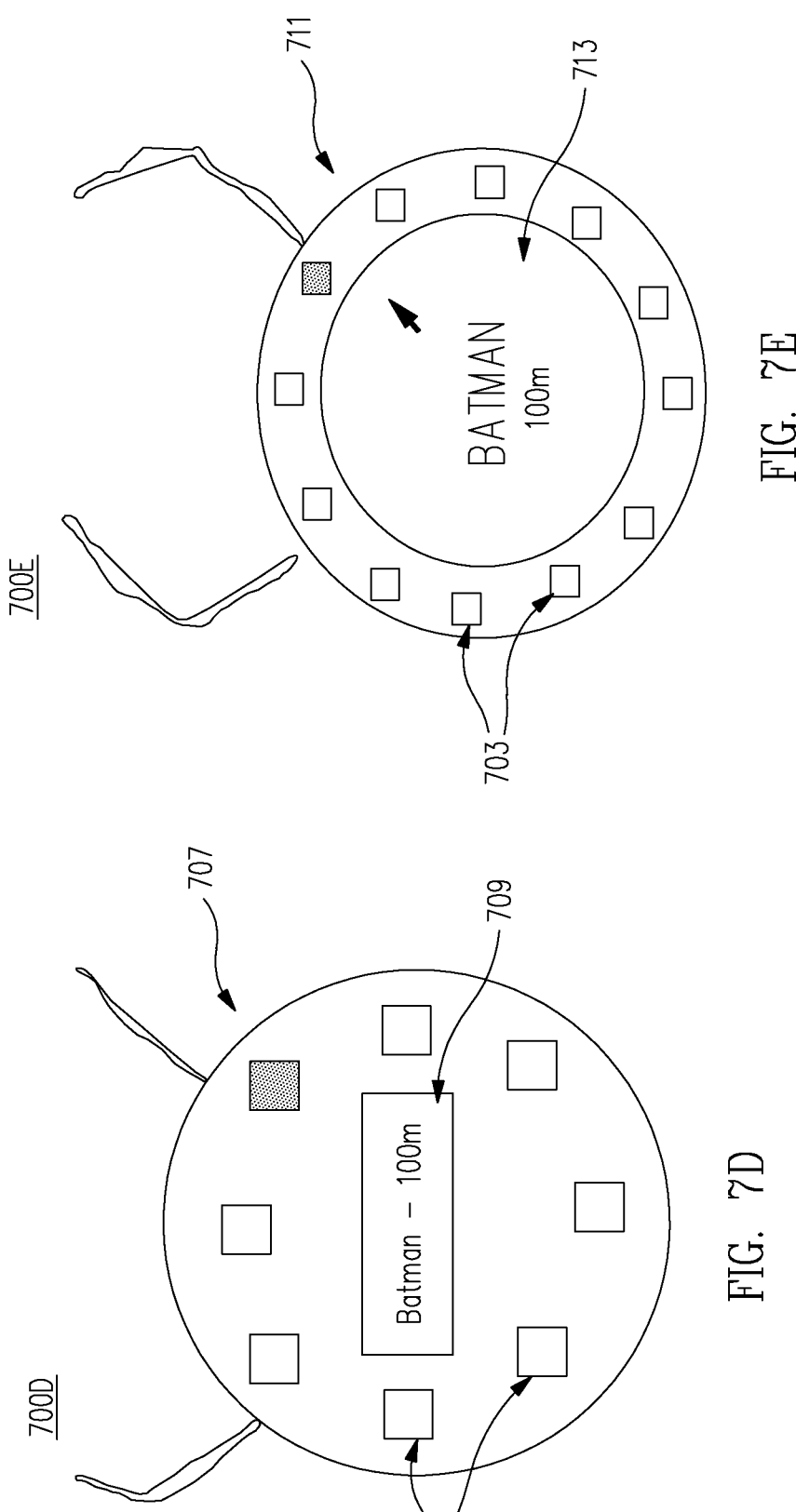
FIG. 7D is an illustrative example of a small screen digital compass device, in accordance with one embodiment.
FIG. 7E is an illustrative example of a large screen digital compass device 711, in accordance with one embodiment.

FIG. 7D is an illustrative example 700D of a small screen digital compass device 707, which utilizes a single ring of LEDs 703 and a small display screen 709 to provide tracking and messaging data, in accordance with one embodiment. In one embodiment, small display screen 709 allows for display of paired user name, location data, and/or message data, while single ring of LEDs 703 provides basic directional information to assist in guiding the user to a paired user. In various embodiments, small screen digital compass device 707 can be paired with a mobile app for additional configuration and customization options. In various embodiments, the LEDs of the single ring of LEDs 703 are programmable and can be used to provide lighting effects in addition to being used for position finding.

FIG. 7E is an illustrative examples 700E of a large screen digital compass device 711, which utilizes a single ring of LEDs 703 and a large display screen 713 to provide tracking and messaging data, in accordance with one embodiment. In various embodiments, large display screen 713 is a high-resolution screen that allows a user to see the location of all the paired users at the same time, while providing distance and direction to specific friends, displaying messages, showing photos, animations, and/or playing videos. In some embodiments large display screen 713 allows for more advanced features, such as those discussed above, including but not limited to, displaying maps with pins and waypoints, and providing event-specific materials such as schedules and setlists.

Figure 8B:
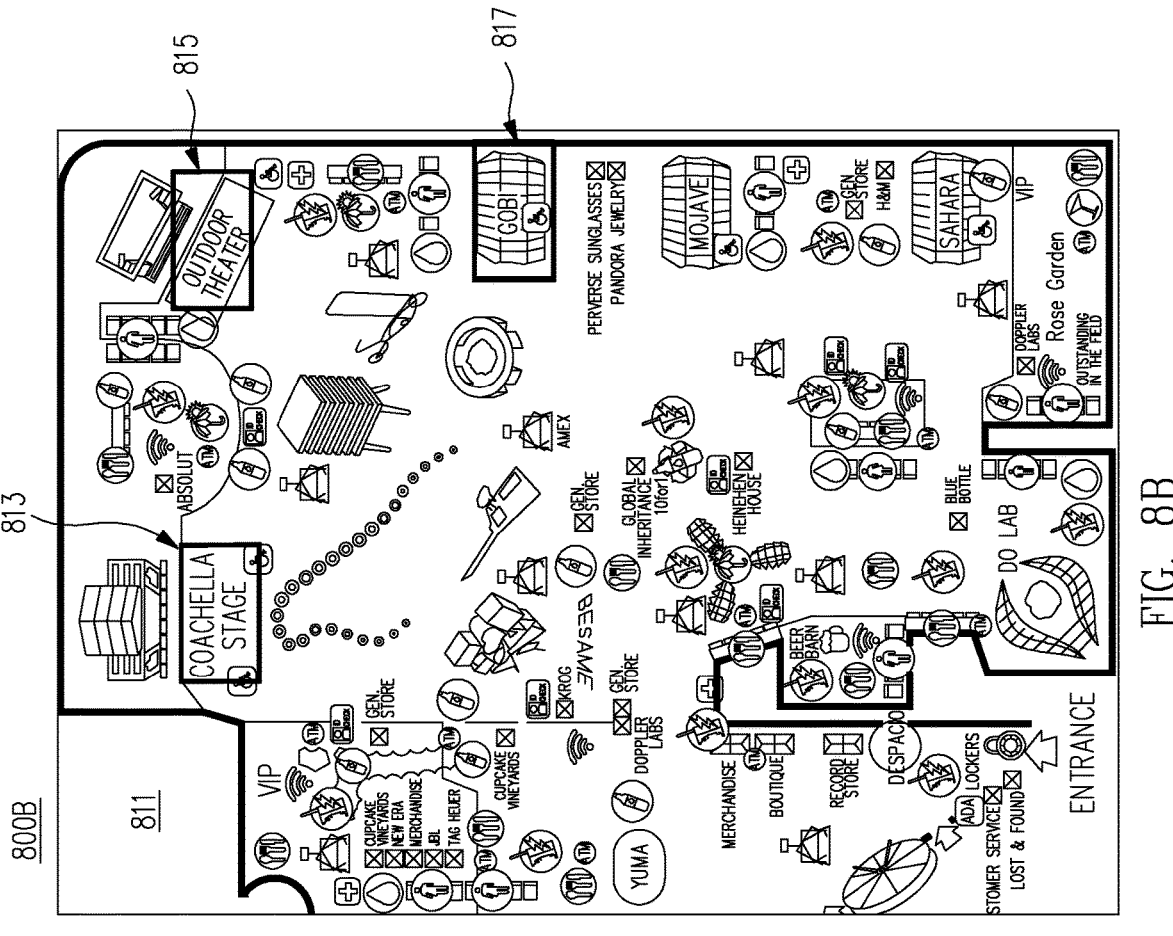
FIG. 8B is an illustrative example of a festival-specific map, which may be utilized by a digital compass device, in accordance with one embodiment.
Figure 8A:
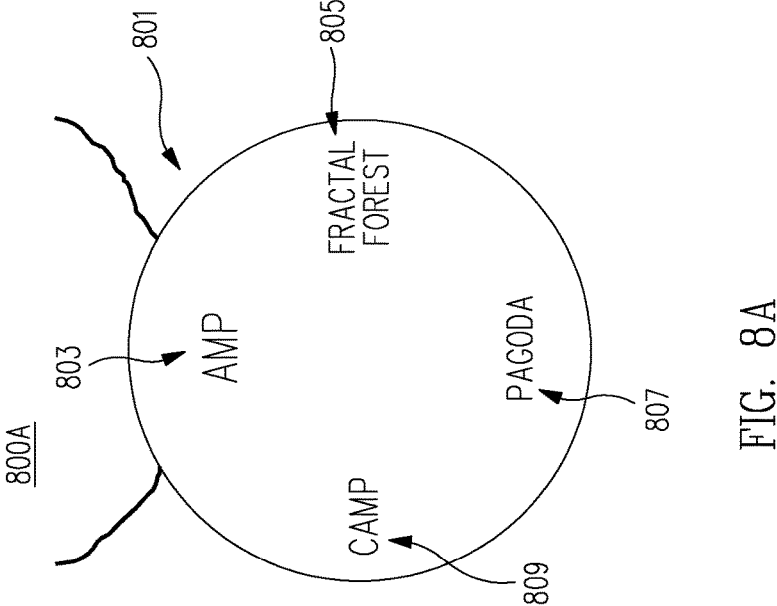
FIG. 8A is an illustrative example of a festival-specific waypoint-based digital compass device, in accordance with one embodiment.

FIG. 8A is an illustrative example 800A of a festival-specific waypoint-based digital compass device 801, in accordance with one embodiment. In one embodiment, festival-specific waypoint-based digital compass device 801 includes preprogrammed GPS waypoints representing stages and other points of interest at a particular event. In various embodiments, festival-specific waypoint-based digital compass device 801 can be custom made for specific festivals and distributed to festival attendees. In the illustrative example of FIG. 8A, four locations of interest are indicated, first event location 803, second event location 805, third event location 807, and fourth event location 809. The locations can be illuminated with a particular color corresponding to the assigned color of the paired compass devices. For example, FIG. 8A indicates that the red user is at the "AMP" stage, the yellow user is at the "Fractal Forest" stage, the blue user is at the "Pagoda" stage, and no users are at the "Camp" location.

FIG. 8B is an illustrative example 800B of festival-specific map 811, which may be utilized by a digital compass device (not shown), in accordance with one embodiment. In various embodiments, festival-specific map 811 may be overlaid on a grid of LEDs of a compass device, where the map includes cutouts over points of interest such as stages, restrooms, and vendors to let the LEDs shine through the map. For example, festival-specific map 811 shows that the purple user is at the "Coachella" stage, the blue user is at the "Outdoor Theater" stage, and the green user is at the "Gobi" stage.

It should be noted that the above-described alternate embodiments are provided for illustrative purposes only and are not intended to limit the scope of the invention as disclosed and claimed herein. It should be appreciated by those of skill in the art, that any combination and arrangement of LEDs, screen sizes, devices sizes, and waypoint data can be used with the system and methods disclosed herein to achieve similar effect. Further, each of the above-described alternate embodiments can be optionally paired with an external application to provide additional features and allow for configuration and customization, such as, but not limited to, the features discussed above.

Figures 9A, 9B, 9C:
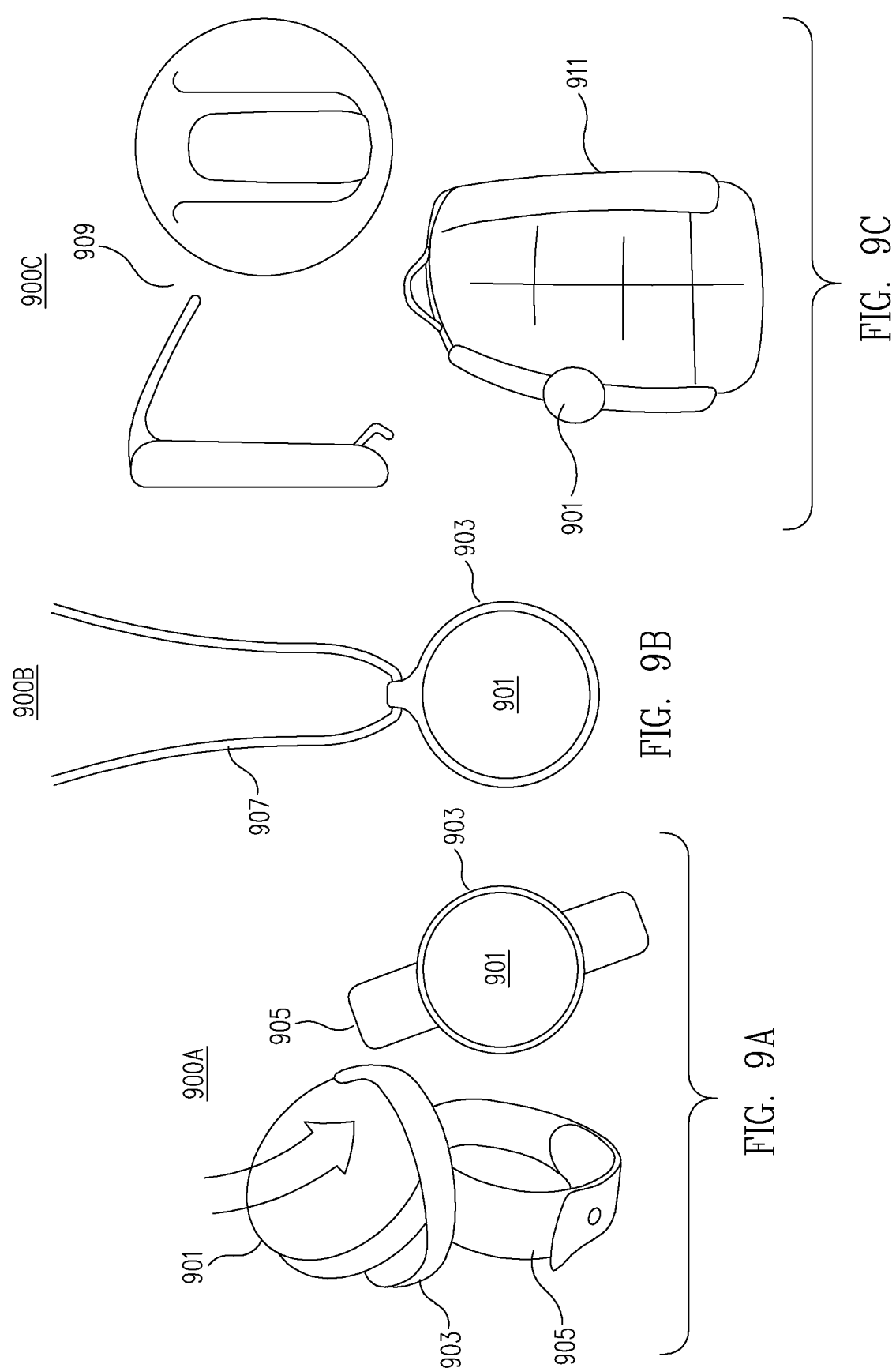
FIG. 9A through FIG. 9C are illustrative examples of various accessories that may be offered for use with a digital compass device, in accordance with various embodiments.

FIG. 9A through FIG. 9C are illustrative examples 900A through 900C of various accessories that may be offered for use with a digital compass device, in accordance with various embodiments. FIG. 9A shows digital compass device 901 inserted into protective sleeve 903. In one embodiment, protective sleeve 903 is able to be coupled with a strap, such as wrist strap 905, to allow digital compass device 901 to be worn on the wrist. FIG. 9B shows digital compass device 901 inserted into protective sleeve 903. In one embodiment, protective sleeve 903 is able to be coupled with a lanyard, such as lanyard 907 to allow digital compass device 901 to be hung from a user's neck, clothing item, or other personal property. FIG. 9C shows digital compass device 901 attached to a portion of a user's personal item 911 via a strap/clip mechanism 909. In various embodiments, accessories may include, but are not limited to, loops, straps, clips, lanyards, and sleeves, which enable the digital compass device 901 to be attached to bags or clothes or worn as a necklace, bracelet, watch or other type of wearable accessory.

As noted above, embodiments of the present disclosure provide technical solutions to long-standing technical problems associated with easily, cheaply, effectively, and reliably locating and communicating with members of a group in crowded and/or remote settings without requiring use of cellular or Wi-Fi networks. As discussed herein, the disclosed embodiments include a digital compass device capable of locating and communicating with a plurality of other digital compass devices without requiring use of cellular or Wi-Fi networks. In various embodiments, the digital compass devices gather positional data via GPS signals and use radio signals to create a mesh network which is capable of relaying positional data and message data across all nodes in the mesh network. In one embodiment, the digital compass device can be held in a user's hand, attached to clothing or personal items, and/or worn as an accessory. In one embodiment, the front face of the digital compass device displays LED lights, which are capable of showing a user the location of other users, displaying text messages, alerts, notifications, and/or animations. In some embodiments, the digital compass device is able to pair with an external application, such as a mobile application, which provides access to a number of additional features such as, but not limited to, enhanced message sending, public and emergency broadcast channels, device lighting effects cus- tomizations, advanced group management capabilities, social media platform and community engagement features, integrated event-specific features, and remote firmware updates.

In various embodiments, a digital compass device com- prises an outer shell, wherein the outer shell houses a printed circuit board (PCB), and further wherein the PCB includes, a Global Positioning System (GPS) assembly, one or more radio assemblies, a visual display mechanism, and a micro- controller, including at least one processor and at least one memory.

In one embodiment, the microcontroller is configured to pair, using one or more of the radio assemblies the digital compass device with one or more additional digital compass devices, obtain, using the GPS assembly, positional data representing the geographic location of the digital compass device, transmit, using one or more of the radio assemblies, the positional data of the digital compass device to one or more of the paired additional digital compass devices, and receive, using one or more of the radio assemblies, the positional data associated with one or more of the paired additional digital compass devices. In one embodiment, the microcontroller is configured to generate a visual represen- tation of the positional data for one or more of the paired additional compass devices and display, using the visual display mechanism, the visual representation of the posi- tional data for one or more of the paired additional compass devices.

In one embodiment, pairing the digital compass device with one or more additional digital compass devices further includes configuring the microcontroller to transmit, using one or more of the radio assemblies, a custom packet including data identifying the digital compass device, receive, using one or more of the radio assemblies, identi- fication data for each of the one or more additional digital compass devices, and generate an internal compass device list containing the identification data for each of the one or more additional digital compass devices, wherein the iden- tification data includes an ID number. In one embodiment, the pairing the digital compass device with one or more additional digital compass devices further includes, after a pre-defined period of time, sorting the compass device list by ID number to generate an ordered compass device list, utilizing an encryption algorithm to generate a pre-shared encryption key based on selected pieces of data from the ordered compass device list, and utilizing the pre-shared encryption key to create a mesh network, wherein the mesh network utilizes one or more of the radio assemblies to facilitate communication of data between the digital com- pass device and one or more of the additional digital compass devices.

In one embodiment, a microcontroller of each of the one or more additional compass devices generates an ordered compass device list that is identical to the ordered compass device list generated by the digital compass device. In one embodiment, a microcontroller of each of the one or more additional compass devices utilizes the same encryption algorithm used by the digital compass device such that the one or more additional compass devices generate a pre- shared encryption key that is identical to the pre-shared encryption key generated by the digital compass device.

In one embodiment, the digital compass device further includes a gyroscope, an accelerometer, a magnetometer, and upon obtaining the positional data representing the geographic location of the digital compass device and receiving the positional data associated with one or more of the paired additional compass devices, the microcontroller is further configured to determine the magnetic declination for the location of the digital compass device, obtain, from the magnetometer, magnetic field vectors representing the earth's magnetic field, determine, from the gyroscope and accelerometer, the orientation of the digital compass device, calculate, using the magnetic field vectors and the orienta- tion of the digital compass device, a tilt compensated magnetic heading, apply the tilt compensated magnetic heading to the magnetic declination to obtain the true heading of the digital compass device, utilize the true heading of the digital compass device and the positional data associated with the one or more paired additional compass devices to calculate the relative bearing of one or more of the paired additional compass devices, and calculate the dis- tance between the digital compass device and one or more of the paired additional compass devices.

In one embodiment the GPS assembly of the PCB includes a GPS chip and a GPS antenna, wherein the PCB has a section of its surface removed to accommodate the GPS antenna, such that the surface of the PCB does not interfere with the GPS signal. In one embodiment, the GPS assembly further includes a backup battery for the GPS chip, wherein the backup battery keeps a clock on the GPS chip awake while the digital compass device is not receiving other forms of power.

In one embodiment, the visual display mechanism of the digital compass device includes one or more of an upper portion of the outer shell, a single ring of LEDs two or more concentric LED rings, an LED matrix, and a display screen. In one embodiment, the upper portion of the outer shell of the digital compass device is translucent such that one or more LEDs of the visual display mechanism are at least partially visible through the upper portion of the outer shell. In one embodiment, the visual display mechanism of the digital compass device includes two or more concentric LED rings and an LED matrix, wherein the two or more concentric LED rings and the LED matrix are arranged such that one or more of the LEDs in the LED matrix forms one or more portions of one or more of the concentric LED rings.

In one embodiment, the microcontroller of the digital compass device is further configured to utilize one or more of the radio assemblies to transmit and receive message data. In one embodiment, the message data is displayed via the visual display mechanism of the digital compass device. In one embodiment, the message data includes one or more of text messages, alerts, animations, videos, and maps.

In one embodiment, a method for enabling location find- ing and message communication between a plurality of digital compass devices comprises providing two or more digital compass devices to two or more users, wherein the two or more digital compass devices form an associated group of compass devices, and pairing each digital compass device in the group of compass devices with each of the other digital compass devices in the group of compass devices. In one embodiment the method further includes, for each of the paired digital compass devices, obtaining posi- tional data representing the digital compass device's own location, transmitting the digital compass device's own positional data to one or more of the other paired digital compass devices, receiving the positional data associated with one or more of the other paired digital compass devices, generating a visual representation of the received positional data associated with one or more of the other paired compass devices, and displaying the visual representation of the received positional data to the user of the digital compass device.

In one embodiment, pairing each digital compass device in the group of compass devices with each of the other digital compass devices in the group of compass devices further includes, for each digital compass device in the group of compass devices, transmitting a custom packet including identification data associated with the digital compass device, receiving identification data associated with each of the other digital compass devices in the group of compass devices, generating an internal compass device list containing the identification data associated with the digital compass device and the identification data associated with each of the other digital compass devices in the group of compass devices, wherein the identification data includes an ID number, after a pre-defined period of time, sorting the compass device list by ID number to generate an ordered compass device list, utilizing an encryption algorithm to generate a pre-shared encryption key based on selected pieces of data from the ordered compass device list, and utilizing the pre-shared encryption key to create a mesh network, wherein the mesh network utilizes one or more radio assemblies to facilitate communication of data between the digital compass device and one or more of the additional digital compass devices.

In one embodiment, each of the digital compass devices in the group of compass devices generates an ordered compass device list that is identical to the ordered compass device list generated by the other digital compass devices in the group of compass devices. In one embodiment, each of the digital compass devices in the group of compass devices utilizes the same encryption algorithm such that each of the digital compass devices in the group of compass devices generate a pre-shared encryption key that is identical to the pre-shared encryption key generated by the other digital compass devices in the group of compass devices.

In one embodiment, upon obtaining positional data representing the digital compass device's own location and receiving positional data associated with one or more of the other paired compass devices, the method further includes determining the magnetic declination for the location of the digital compass device, obtaining magnetic field vectors representing the earth's magnetic field, determining the orientation of the digital compass device, calculating, using the magnetic field vectors and the orientation of the digital compass device, a tilt compensated magnetic heading, applying the tilt compensated magnetic heading to the magnetic declination to obtain the true heading of the digital compass device, utilizing the true heading of the digital compass device and the positional data associated with one or more of the other paired compass devices to calculate the relative bearing of one or more of the other paired compass devices, and calculating the distance between the digital compass device and one or more of the other paired compass devices.

In one embodiment, for each digital compass device in the group of digital compass devices, the method further includes transmitting message data to one or more of the other digital compass devices in the group of digital compass devices, receiving message data from one or more of the other digital compass devices in the group of digital compass devices, and displaying message data to the user of the digital compass device.

In one embodiment, a system for enabling location finding and message communication between a plurality of digital compass devices comprises two or more digital compass devices, wherein the two or more digital compass devices form an associated group of compass devices, a Global Positioning System (GPS) assembly, one or more radio assemblies, a visual display mechanism, and a microcontroller. In one embodiment, the microcontroller includes at least one processor and at least one memory, and the microcontroller is configured to pair, using one or more of the radio assemblies, each digital compass device in the group of compass devices with each of the other digital compass devices in the group of compass devices. In one embodiment, for each of the paired digital compass devices, the microcontroller is further configured to obtain, using the GPS assembly, positional data representing the digital compass device's own location, transmit, using one or more of the radio assemblies, the digital compass device's own positional data to one or more of the other paired digital compass devices, receive, using one or more of the radio assemblies, the positional data associated with one or more of the other paired digital compass devices, generate a visual representation of the received positional data associated with one or more of the other paired compass devices, and display, using the visual display mechanism, the visual representation of the received positional data to a user of the digital compass device.

Consequently, the embodiments disclosed herein are directed to providing technical solutions to long-standing technical problems associated with easily, cheaply, effectively, and reliably locating and communicating with members of a group in crowded and/or remote settings without requiring use of cellular or Wi-Fi networks. Additionally, the disclosed method and system requires a specific hardware construction and a specific detailed process with clearly defined operations, and as such, does not encompass, embody, or preclude other forms of innovation in the fields of location finding and remote communications. Further, the disclosed embodiments not abstract ideas, as the disclosed embodiments cannot be performed mentally or using pen and paper, do not encompass a fundamental economic practice or a mere method of organizing human activity, and also are not directed simply to a mathematical relationship/formula.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A digital compass device comprising:
an outer shell, wherein the outer shell houses a printed circuit board (PCB), and further wherein the PCB includes:
a Global Positioning System (GPS) assembly;
one or more radio assemblies;
a visual display mechanism; and
a microcontroller, including at least one processor and at least one memory, the microcontroller configured to:
pair, using one or more of the radio assemblies, the digital compass device with one or more additional digital compass devices;
obtain, using the GPS assembly, positional data representing a geographic location of the digital compass device;
transmit, using one or more of the radio assemblies, the positional data representing the geographic location of the digital compass device to one or more of the paired additional digital compass devices;
receive, using one or more of the radio assemblies, positional data associated with one or more of the paired additional digital compass devices;
generate a visual representation of the positional data associated with one or more of the paired additional compass devices; and
display, using the visual display mechanism, the visual representation of the positional data associated with one or more of the paired additional compass devices.

2. The digital compass device of claim 1 wherein pairing the digital compass device with one or more additional digital compass devices further includes configuring the microcontroller to:
transmit, using one or more of the radio assemblies, a custom packet including data identifying the digital compass device;
receive, using one or more of the radio assemblies, identification data for each of the one or more additional digital compass devices;
generate an internal compass device list containing the identification data for each of the one or more additional digital compass devices, wherein the identification data includes an ID number;

after a pre-defined period of time, sort the compass device list by ID number to generate an ordered compass device list;
utilize an encryption algorithm to generate a pre-shared encryption key based on selected pieces of data from the ordered compass device list; and
utilize the pre-shared encryption key to create a mesh network, wherein the mesh network utilizes one or more of the radio assemblies to facilitate communication of data between the digital compass device and one or more of the additional digital compass devices.

3. The digital compass device of claim 2 wherein a microcontroller of each of the one or more additional compass devices generates an ordered compass device list that is identical to the ordered compass device list generated by the digital compass device.

4. The digital compass device of claim 3 wherein a microcontroller of each of the one or more additional compass devices utilizes the same encryption algorithm used by the digital compass device such that the one or more additional compass devices generate a pre-shared encryption key that is identical to the pre-shared encryption key generated by the digital compass device.

5. The digital compass device of claim 1, further including:
a gyroscope;
an accelerometer; and
a magnetometer,
wherein upon obtaining the positional data representing the geographic location of the digital compass device and receiving the positional data associated with one or more of the paired additional compass devices, the microcontroller is further configured to:
determine the magnetic declination for the location of the digital compass device;
obtain, from the magnetometer, magnetic field vectors representing the earth's magnetic field;
determine, from the gyroscope and accelerometer, the orientation of the digital compass device;
calculate, using the magnetic field vectors and the orientation of the digital compass device, a tilt compensated magnetic heading;
apply the tilt compensated magnetic heading to the magnetic declination to obtain the true heading of the digital compass device;
utilize the true heading of the digital compass device and the positional data associated with the one or more paired additional compass devices to calculate the relative bearing of one or more of the paired additional compass devices; and
calculate the distance between the digital compass device and one or more of the paired additional compass devices.

6. The digital compass device of claim 1 wherein the GPS assembly of the PCB includes a GPS chip and a GPS antenna, and further wherein the PCB has a section of its surface removed to accommodate the GPS antenna, such that the surface of the PCB does not interfere with the GPS signal.

7. The digital compass device of claim 6 wherein the GPS assembly further includes a backup battery for the GPS chip, wherein the backup battery keeps a clock on the GPS chip awake while the digital compass device is not receiving other forms of power.

8. The digital compass device of claim 1 wherein the visual display mechanism includes one or more of:
an upper portion of the outer shell;

a single ring of LEDs;

two or more concentric LED rings;

an LED matrix; and a display screen.

9. The digital compass device of claim 8 wherein the upper portion of the outer shell is translucent such that one or more LEDs of the visual display mechanism are at least partially visible through the upper portion of the outer shell.

10. The digital compass device of claim 8 wherein the visual display mechanism includes two or more concentric LED rings and an LED matrix, and further wherein the two or more concentric LED rings and the LED matrix are arranged such that one or more of the LEDs in the LED matrix forms one or more portions of one or more of the concentric LED rings.

11. The digital compass device of claim 1 wherein the microcontroller is further configured to utilize one or more of the radio assemblies to transmit and receive message data.

12. The digital compass device of claim 11, wherein the message data is displayed via the visual display mechanism of the digital compass device.

13. The digital compass device of claim 12, wherein message data includes one or more of:

text messages;

alerts;

animations;

videos; and maps.

14. A method for enabling location finding and message communication between a plurality of digital compass devices comprising:

providing two or more digital compass devices to two or more users, wherein the two or more digital compass devices form an associated group of compass devices;

pairing each digital compass device in the group of compass devices with each of the other digital compass devices in the group of compass devices;

for each paired digital compass device in the group of compass devices:

obtaining positional data representing a location of the digital compass device's own location;

transmitting the positional data representing the location of the digital compass device's to one or more of the other paired digital compass devices in the group of compass devices;

receiving positional data associated with one or more of the other paired digital compass devices in the group of compass devices;

generating a visual representation of the positional data associated with one or more of the other paired digital compass devices in the group of compass devices; and displaying the visual representation of the positional data to the user of the digital compass device.

15. The method of claim 14 wherein pairing each digital compass device in the group of compass devices with each of the other digital compass devices in the group of compass devices further includes:

for each digital compass device in the group of compass devices:

transmitting a custom packet including identification data associated with the digital compass device;

receiving identification data associated with each of the other digital compass devices in the group of compass devices;

generating an internal compass device list containing the identification data associated with the digital compass device and the identification data associated with each of the other digital compass devices in the group of compass devices, wherein the identification data includes an ID number;

after a pre-defined period of time, sorting the compass device list by ID number to generate an ordered compass device list;

utilizing an encryption algorithm to generate a pre-shared encryption key based on selected pieces of data from the ordered compass device list; and utilizing the pre-shared encryption key to create a mesh network, wherein the mesh network utilizes one or more radio assemblies to facilitate communication of data between the digital compass device and each of the other digital compass devices in the group of compass devices.

16. The method of claim 15 wherein each of the digital compass devices in the group of compass devices generates an ordered compass device list that is identical to the ordered compass device list generated by the other digital compass devices in the group of compass devices.

17. The method of claim 16 wherein each of the digital compass devices in the group of compass devices utilizes the same encryption algorithm such that each of the digital compass devices in the group of compass devices generate a pre-shared encryption key that is identical to the pre-shared encryption key generated by the other digital compass devices in the group of compass devices.

18. The method of claim 14 further including, upon obtaining positional data representing the digital compass device's own location and receiving positional data associated with one or more of the other paired compass devices:

determining the magnetic declination for the location of the digital compass device;

obtaining magnetic field vectors representing the earth's magnetic field;

determining the orientation of the digital compass device;

calculating, using the magnetic field vectors and the orientation of the digital compass device, a tilt compensated magnetic heading;

applying the tilt compensated magnetic heading to the magnetic declination to obtain the true heading of the digital compass device;

utilizing the true heading of the digital compass device and the positional data associated with one or more of the other paired compass devices to calculate the relative bearing of one or more of the other paired compass devices; and calculating the distance between the digital compass device and one or more of the other paired compass devices.

19. The method of claim 14 further comprising, for each digital compass device in the group of digital compass devices:

transmitting message data to one or more of the other digital compass devices in the group of digital compass devices;

receiving message data from one or more of the other digital compass devices in the group of digital compass devices; and displaying message data to the user of the digital compass device.

20. A system for enabling location finding and message communication between a plurality of digital compass devices comprising:

two or more digital compass devices, wherein the two or more digital compass devices form an associated group of compass devices;

a Global Positioning System (GPS) assembly;

one or more radio assemblies; a visual display mechanism; and a microcontroller, including at least one processor and at least one memory, the microcontroller configured to:

pair, using one or more of the radio assemblies, each digital compass device in the group of compass devices with each of the other digital compass devices in the group of compass devices;

for each paired digital compass device in the group of compass devices:

obtain, using the GPS assembly, positional data representing a location of the digital compass device;

transmit, using one or more of the radio assemblies, the positional data representing the location of the digital compass device to one or more of the other paired digital compass devices in the group of compass devices;

receive, using one or more of the radio assemblies, positional data associated with one or more of the other paired digital compass devices in the group of compass devices; generate a visual representation of the positional data associated with one or more of the other paired digital compass devices in the group of compass devices; and display, using the visual display mechanism, the visual representation of the positional data to a user of the digital compass device.

\* \* \* \* \*